United States Patent
Alouani et al.

(10) Patent No.: US 6,567,795 B2
(45) Date of Patent: May 20, 2003

(54) ARTIFICIAL NEURAL NETWORK AND FUZZY LOGIC BASED BOILER TUBE LEAK DETECTION SYSTEMS

(75) Inventors: Ali T. Alouani, Cookeville, TN (US); Peter S. Chang, Hixon, TN (US)

(73) Assignees: Tennessee Technological University, Cookeville, TN (US); Tennessee Valley Authority, Knoxville, TN (US)

( * ) Notice: Subject to any disclaimer, the term of this patent is extended or adjusted under 35 U.S.C. 154(b) by 33 days.

(21) Appl. No.: 09/726,516

(22) Filed: Dec. 1, 2000

(65) Prior Publication Data

US 2001/0001149 A1 May 10, 2001

Related U.S. Application Data

(62) Division of application No. 09/026,822, filed on Feb. 20, 1998, now Pat. No. 6,192,352.

(51) Int. Cl.[7] .............................................. G06F 15/18
(52) U.S. Cl. ............................. 706/8; 706/2; 706/902; 706/907
(58) Field of Search .............................. 706/8, 2, 902, 706/907

(56) References Cited

U.S. PATENT DOCUMENTS

| | | | | |
|---|---|---|---|---|
| 5,132,920 A | * | 7/1992 | Bellows et al. ............. | 702/184 |
| 5,249,954 A | * | 10/1993 | Allen et al. ................. | 431/14 |
| 5,847,266 A | * | 12/1998 | Nevruz ........................ | 122/382 |
| 5,966,683 A | * | 10/1999 | Millett et al. ............... | 702/179 |

OTHER PUBLICATIONS

T. Zhong et al., "On The Identification of Sensitive Variables of Boiler Tube Leaks", Tennesse Technological University, Proc. 29th IEEE Southeastern Symposium on Systems Theory, Cookeville, TN, Mar. 1997, pp. 196–200.

T. Zhong et al., "ANN Based Tube Leak Detection System", Tennessee Technological University, Proc. 29th IEEE Southeastern Symposium on Systems Theory, Cookeville, TN, Mar. 1997, pp. 211–215.

* cited by examiner

Primary Examiner—George B. Davis
(74) Attorney, Agent, or Firm—Joseph A. Giampapa

(57) ABSTRACT

Power industry boiler tube failures are a major cause of utility forced outages in the United States, with approximately 41,000 tube failures occurring every year at a cost of $5 billion a year. Accordingly, early tube leak detection and isolation is highly desirable. Early detection allows scheduling of a repair rather than suffering a forced outage, and significantly increases the chance of preventing damage to adjacent tubes. The instant detection scheme starts with identification of boiler tube leak process variables which are divided into universal sensitive variables, local leak sensitive variables, group leak sensitive variables, and subgroup leak sensitive variables, and which may be automatically be obtained using a data driven approach and a leak sensitivity function. One embodiment uses artificial neural networks (ANN) to learn the map between appropriate leak sensitive variables and the leak behavior. The second design philosophy integrates ANNs with approximate reasoning using fuzzy logic and fuzzy sets. In the second design, ANNs are used for learning, while approximate reasoning and inference engines are used for decision making. Advantages include use of already monitored process variables, no additional hardware and/or maintenance requirements, systematic processing does not require an expert system and/or a skilled operator, and the systems are portable and can be easily tailored for use on a variety of different boilers.

25 Claims, 9 Drawing Sheets

ARTIFICIAL NEURAL NETWORK AND FUZZY LOGIC BASED BOILER TUBE LEAK DETECTION SYSTEMS

This is a divisional of application Ser. No. 09/026,822 filed Feb. 20, 1998, now U.S. Pat. No. 6,192,352.

INTRODUCTION

The present invention in its most preferred embodiments relates to the detection of leaks in boiler tubes; more particularly it relates to the early detection of leaks in tubes of industrial type boilers to thereby allow the operators of such boilers, including utilities, to schedule a shut down for repair rather than suffer a forced outage when such leaks later become catastrophic; and still more particularly to such early detection of leaks to thereby significantly increase the chances of limiting damage to adjacent tubes in such boilers. The present new and improved system utilizes an approach different from those heretofore taken and taught in the prior art. As utilized herein, there is effected the monitoring of a set of tube leak sensitive variables, i.e. variables which exhibit significant changes whenever a leak occurs in a boiler tube. It will be appreciated, of course, that when a tube starts to leak, the output values of these sensitive variables start to change in response to that particular leak. In addition, in the approach utilized in the development of the instant invention including the methods, techniques, and system comprising same, the approach has been to correlate more than one sensitive variable to such leak. Accordingly, by relying on different sources of information about a leak and by correlating a number of leak sensitive variables, it has been found that the likelihood of early detection of such leaks is greatly enhanced. As will be appreciated from a more detailed description infra, in the technique comprising the instant invention, one of the first tasks was to find a functional map between the changes in a plurality of such sensitive variables and the occurrence of a tube leak, i.e. a multi-variable function whose parameters are the sensitive variables and whose output is the tube leak level. Of course, classical approximation methods might be used to find this map as, for instance, by using the Weierstrauss theorem wherein a continuous function can be approximated to an arbitrary degree of accuracy through the utilization of classical techniques employing, for instance, a polynomial. However, for the very complex situation related to tube leaks in boilers, there are several reasons why such classical approximation methods are not suitable including, for instance, that such technique requires one to assume a priori form of the map, i.e. the degree of the polynomial in order to approximate same. A further reason why such approximation methods are not suitable is that extensive computer simulations have shown that for high order polynomials, which would be the case in the present invention arena, the approximation of complex maps results in numerical instabilities which are encountered during the computation of the coefficients of the polynomial. Still another reason for not using such a classical approach is that it is fraught with the difficulties of being not easily implemented in computer hardware. On the other hand, the instant invention, in its simpler form, utilizes artificial neural networks (ANN) to identify the complex map. Since ANNs are known to be model free approximaters one does not need to assume a priori form of the map and further computer simulations are easily and effectively utilized in both computer hardware and software. Accordingly, the instant invention relates to the utilization of a plurality of ANNs to detect the presence of a tube leak as well as determine its location in the boiler.

Further, the instant technique utilizes a decentralized architecture or structure for such networks. More specifically, a first ANN is utilized to make a relatively simple decision concerning the presence of a leak. This first ANN is trained on what is herein referred to as universal leak sensitive variables (ULSV), which are sensitive variables that respond to a leak in a boiler regardless of its location therein. Once such first ANN determines that there is indeed a leak in the boiler, the next process step in the practice of the instant invention is to utilize what is herein referred to as local leak sensitive variables (LLSV), rather than said ULSVs, which LLSVs are most sensitive for a given location both along a tube and across the cross section of the boiler. It has been found that there are a plurality of common sensitive variables for designated locations in a boiler and the present invention utilizes the most sensitive thereof for a given location wherein the presence of the leak is manifested by a change in the same subset of such LLSVs. Accordingly, a plurality of dedicated ANNS are utilized in this second step to perform localized leak detection for the location of such common sensitive variables. Although ANNs are known to be universal approximaters, they utilize data driven approaches which translates into performance acceptable for boilers having similar characteristics. In other words, an ANN based system although quite improved over heretofore prior art methods for early detection of tubes requires that after it is trained it be utilized only on similar type boilers. Since a principle object of the instant invention is, at least in the more sophisticated embodiments thereof, to provide a high degree of portability of the instant system wherein is required a minimum of tuning of same when it is used and moved from one boiler to another, the more advanced embodiments of this invention utilize the integration of fuzzy logic with such ANNs whereby is utilized available input-output information about tube leaks to build a fuzzy map whose input is available, numerical, and linguistic tube leak information and whose output is characterization of the sensitive variables. In this more sophisticated approach, there is utilized inference engines to invert the resulting map and to render more accurate decisions about tube leaks in boilers. The decision making procedure utilized in the operation in these more sophisticated integrated systems has been found to be greatly implemented by the use of a set of "If Then" rules.

BACKGROUND OF THE INVENTION

The present invention relates generally to new, improved, and reliable systems, methods, and techniques for the detection of leaks in the tubes of industrial boilers, including those of the types used by utilities to produce steam for electric power production.

Boiler Tube Leak Detection. Because of heat, pressure, and wear over time, boiler tubes eventually begin to leak, i.e., the beginning of a "leak event." When a boiler tube(s) starts to leak, steam which flashes over from the water escaping through the leak therein is lost to the boiler environment. In general, the amount of leaked water/steam may be small at the inception of a tube leak event. However, unless the tube is repaired, the leak will continue to grow, i.e., the tube leak rate increases with time until the tube eventually ruptures. Once such rupture occurs the utility operating such boiler is forced to shut it down immediately.

Boiler tube failures are a major cause of forced shut downs in fossil power plants. For example, approximately 41,000 tube failures occur every year in the United States alone. The cost of these failures proves to be quite expensive for utilities, exceeding $5 billion a year. [Lind, M. H., "Boiler Tube Leak Detection System," Proceedings of the Third EPRI Incipient-Failure Detection Conference, EPRI CS-5395, Mar. 1987]. In order to reduce the occurrences of such forced outages, early boiler tube leak detection is highly desirable. Early boiler tube leak detection would allow utilities to schedule a repair rather than to suffer a later forced outage. In addition, the earlier the detection, the better the chances are of limiting damage to adjacent tubes.

Artificial Neural Networks. Artificial neural networks (ANNs) are information-processing models inspired by the architecture of the human brain. ANNs are capable of learning and generalization and are model-free adaptive estimators of maps (relations between the input and the output of the ANN, or, as later referenced, an inference engine) which learn using example data. As is discussed in the prior art, including the patent literature, when a neural network is to be used in detection applications, it is necessary to execute beforehand a learning procedure for establishing suitable parameter values within the ANN. In the learning procedure, a set of sample patterns (referred to herein as the learning data), which have been selected in accordance with the patterns which are to be recognized, are successively inputted to the ANN. For each sample pattern there is a known appropriate output pattern, i.e. a pattern which should be produced from the network in response to that input pattern. The required known output patterns are referred to as the teaching data. In the learning procedure, the learning data patterns are successively supplied to the ANN, and resultant output patterns produced from the ANN are compared with the corresponding teaching data patterns, to obtain respective amounts of recognition error. The internal parameters of the ANN are successively adjusted in accordance with these sequentially obtained amounts of error, using a suitable learning algorithm. These operations are repetitively executed for the set of learning data, until a predetermined degree of convergence towards a maximum degree of pattern recognition is achieved (i.e., the maximum that can be achieved by using that particular set of learning data). The degree of recognition can be measured as a recognition index, expressed, for example, as a percentage.

The greater the number of sample patterns constituting the learning data, the greater will be the invariant characteristic information that is learned by the ANN. Alternatively stated, a learning algorithm which is utilized in such a procedure (i.e. for adjusting the ANN internal parameters in accordance with the error amounts obtained during the learning procedure) attempts to achieve learning of a complete set of probability distributions of a statistical population, i.e. a statistical population which consists of data, consisting of all of the possible patterns which the ANN will be required to recognize after learning has been achieved. That is to say, the learning algorithm performs a kind of pre-processing, prior to actual pattern recognition operation being started, whereby characteristics of the patterns which are to be recognized are extracted and applied to modify the internal parameters of the ANN.

In the practice of the prior art it has been necessary to utilize as large a number of sample data in the learning procedure as possible, in order to maximize the recognition index which is achieved for a ANN. However, there are practical limitations on the number of sample patterns which can be stored in memory for use as learning data. Furthermore, such learning data may include data which will actually tend to lower the recognition index, if used in the learning procedure. Accordingly, and as will be better appreciated after reading and understanding the more detailed description below, the decentralized architecture or structure of the instant new detection system and the staging of testing significantly overcomes such prior art related disadvantages.

ANNs can be divided into two classes: feed-forward and feedback neural networks. Within each class, ANNs are also characterized by the number of hidden layers, number of neurons in a given layer, and the method of learning. While many different types of learning are available, the back propagation learning algorithm (BPLA) is of the most interest to the practice of the instant invention. The BPLA is an error-correcting learning procedure which uses the gradient descent method to adjust the synaptic weights. BPLA is intended for ANNs with an input layer, any number of hidden layers, and an output layer. In the most preferred embodiments of the instant invention, the ANNs used are feed forward and possess two hidden layers. Other types of ANNs with different topologies and learning algorithms can be used as well. As will be better appreciated from the teachings and discussions found infra, the first two embodiments of the instant invention, i.e. embodiments one and two utilize ANNs to effect the desired and necessary learning and decision making for early detection of boiler tube leak events.

Fuzzy Logic. Exact models of dynamical systems become increasingly difficult to obtain if not impossible as system complexity increases. This fact is summarized by what Zadeh, infra, called the principle of incompatibility:"as the complexity of a system increases, our ability to make precise and yet significant statements about its behavior diminishes until a threshold is reached beyond which precision and significance (or relevance) become almost mutually exclusive characteristics." [L. A. Zadeh, "A theory of approximate reasoning," in J. Hayes, D. Michie, and L. I. Mikulich, (eds.), *Machine Intelligence*, Vol. 9, Halstead Press: New York, SMC-3, 1979].

The uncertainty in the knowledge about real-world systems and their dynamic models has motivated the application of fuzzy set theory to handle real world problems. [L. A. Zadeh, "Fuzzy algorithms,." *Information and Control*, Vol. 12, 1968] [D. Dubois and H. Prade, "Fuzzy Sets and Systems: Theory and Applications," Academic, Orlando, FL., 1980] This motivation stems from the fact that fuzzy set theory provides a suitable representation of the uncertainty in system knowledge and dynamic models. In fuzzy set theory the reasoning in the face of uncertain information, called approximate reasoning, employs fuzzy logic as a framework for uncertain information processing and inference. [R. R. Yager and D. P. Filev. "Essentials of Fuzzy Modeling and Control," *Wiley Interscience*, New York, 1994] Fuzzy set theory is an approach useful for presenting and utilizing linguistic "qualitative" descriptions in computerized inference which improves the potential to model human reasoning in an inexact and uncertain domain in cases where statistical information is not available. The concept of possibility may be used to model the confidence level of various hypotheses by a number between zero and one, where one may be the highest degree of confidence and zero the lowest, or vice versa. In order to quantify inexactness, fuzzy set theory utilizes the notion of a membership function in terms of the level of confidence that a particular element belongs to a particular fuzzy set. Given the complexity of boiler tube leak events, it will be appreciated by those skilled in this art that there exists substantial motivation to utilize fuzzy logic in attempting to effect the detection of boiler tube leaks at the earliest possible moment by a technique which looks for an approximate or "fuzzy" map, between tube leak events and the sensitive variables, supra, and thereafter utilize approximate reasoning for detecting the occurrence and location of boiler tube leaks. Accordingly, the second two embodiments of the instant invention, i.e. embodiments three and four, integrate ANNs and fuzzy logic to effect the desired early detection of boiler tube leaks.

DESCRIPTION OF PRIOR ART

In the prior art, three main techniques have been proposed to detect boiler tube leaks: acoustic based systems, mass balance, and adb hoc expert systems. In the acoustic based systems taught and disclosed in U.S. Pat. No. 3,831,561, Yamamoto et al., Aug. 27, 1974; U.S. Pat. No. 4,960,079, Marziale et al., Oct. 2, 1990; U.S. Pat. No. 4,979,820, Shakkotta et al., Dec. 25, 1990; and U.S. Pat. No. 4,998,439, Shepard, Mar. 12, 1991, the principal idea is to listen, using acoustic sensors, to the sound produced by the jet of steam attendant a tube leak, or, as oftentimes herein referred to, a leak event. The technical limitation to this approach is that often times the sound produced by the tube leak is buried in the background acoustical noise of the tube environment. Accordingly, early detection of a leak is rather difficult because at the early stage of a leak background acoustical noise oftentimes masks or overrides the noise associated with the escaping steam. From a cost standpoint, the prior art technique oftentimes requires fifty or more acoustic sensors to cover the main parts of the boiler where a leak is most likely to occur. In addition, these sensors have to be maintained in proper operating condition thereby resulting in high attendant maintenance costs.

In the mass balance approach, used by some utilities, when a leak occurs there results a dependent increase in the amount of make up flow (amount of water needed to replace the loss of water due to the leak). Such an increase in make up flow is used as an indicator of the magnitude of the leak. As in the acoustic system based approach, supra, when the leak is small, the make up flow is negligible and all but impossible to discern. In addition, the mass balance approach is valid only when the boiler is operating in a steady-state operation. Most often, this particular requirement can not be met since boilers normally operate under constantly changing dynamical conditions caused by attendant control system operation and changes in load on the generating equipment utilizing the boiler output. Most important, this technique is fraught with the paramount disadvantage that even when the occurrence of a leak is detected it can not be used to locate a leak in such boiler.

The add hoc technique consists of detection of tube leaks using a so-called expert system approach. A major drawback and disadvantage of this approach is that it lacks universality. That it to say, it can only be used, after an extended time of modification of the design and tuning, to the specific boiler with which the expert person (the person who provides the rules) is familiar. Because of its add hoc nature, the development cost of such techniques can prove to be prohibitive. The lack of universality of the add hoc approach makes it even less attractive than the two prior art approaches and techniques discussed above.

SUMMARY OF THE INVENTION

The instant, new and novel approach is used to overcome the prior art problems heretofore associated with effective and early detection of boiler tube leak events and is multifaceted. For instance, at the outset of attempting to meet the principal objects of the instant invention, a dependable technique for identifying boiler tube leak sensitive variables was developed. Thereafter and once an occurrence of a tube leak event was determined, the boiler tube leak detection problem dealing with its location was solved by learning the map between such sensitive variables, the leak level, and the leak location. Such learning can be accomplished by the practice of two different mapping procedures with the map between sensitive variables and tube leak being treated as either a crisp map or a fuzzy map. In the first embodiment of the instant invention the crisp map represents a larger number of sensitive variables than does the crisp map utilized in the second embodiment of this new and novel invention. This larger number of variables represents the greater number of transducers-which are currently utilized for control of more modern boilers as opposed to the smaller number of transducers utilized in the monitoring and control of boilers of older design. In the practice of both these embodiments, i.e. one and two, ANNs were used to learn these maps via supervised training. Alternatively, in the practice of the third and fourth embodiments of the instant invention, the map between sensitive variables and a tube leak is modeled as a fuzzy map. It has been determined that fuzzy sets and fuzzy logic may conveniently be used to capture this map in the form of "If Then" fuzzy rules. The parameters of the fuzzy sets in these "If Then" rules are learned using a fuzzy ANN. Once the map is correctly learned, when future measurements of the relevant sensitive variables are input to the ANN based detection system, it will output the value of the map for the particular combination of the variables. If the value of the map is zero, no leak is present. However, once the output of the ANN is nonzero (above a given threshold) a leak is present in the boiler and its location must be identified. Accordingly, herein are described and taught four embodiments designed for detection and localization of boilers tube leaks or leak events in industrial boilers. The first two designs, or embodiments rely solely on ANNs, while the last two, through the utilization of inference engines, integrate ANNs with fuzzy logic.

OBJECTS OF THE INVENTION

It is therefore a principle object of the instant invention to provide utilities and other users of industrial boilers with a new, improved and dependable system which is capable of effecting early detection of boiler tube leaks. The instant, new and novel system, method and technique, instead of requiring additional acoustic sensors, takes advantage of existing process variables which are already in place and are being used for the purpose of boiler control and monitoring. The instant, new and novel systems can be custom tailored to any boiler without the need for input of a so-called human boiler expert. The designs taught, described, and claimed herein employ, in their more advanced development stages, two different technologies. The first and second embodiments use ANNs and the third and fourth embodiments integrate both such ANNs with fuzzy logic. In addition, the implementation of the first embodiment, supra, may be through the utilization of software designed specifically for use therein, although there presently is contemplated the VLSI implementation of this first embodiment, in the form of a VLSI chip.

Still further and more general objects and advantages of the present invention will appear from the more detailed description set forth below, it being understood, however, that this more detailed description is given by way of illustration and explanation only, and not necessarily by way of limitation since various changes therein may be made by those skilled in the art without departing from the true spirit and scope of the present invention.

DESCRIPTION OF THE DRAWINGS

In order to more fully understand the manner in which the above-recited and other advantages and objects of the instant invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

Figure 1:
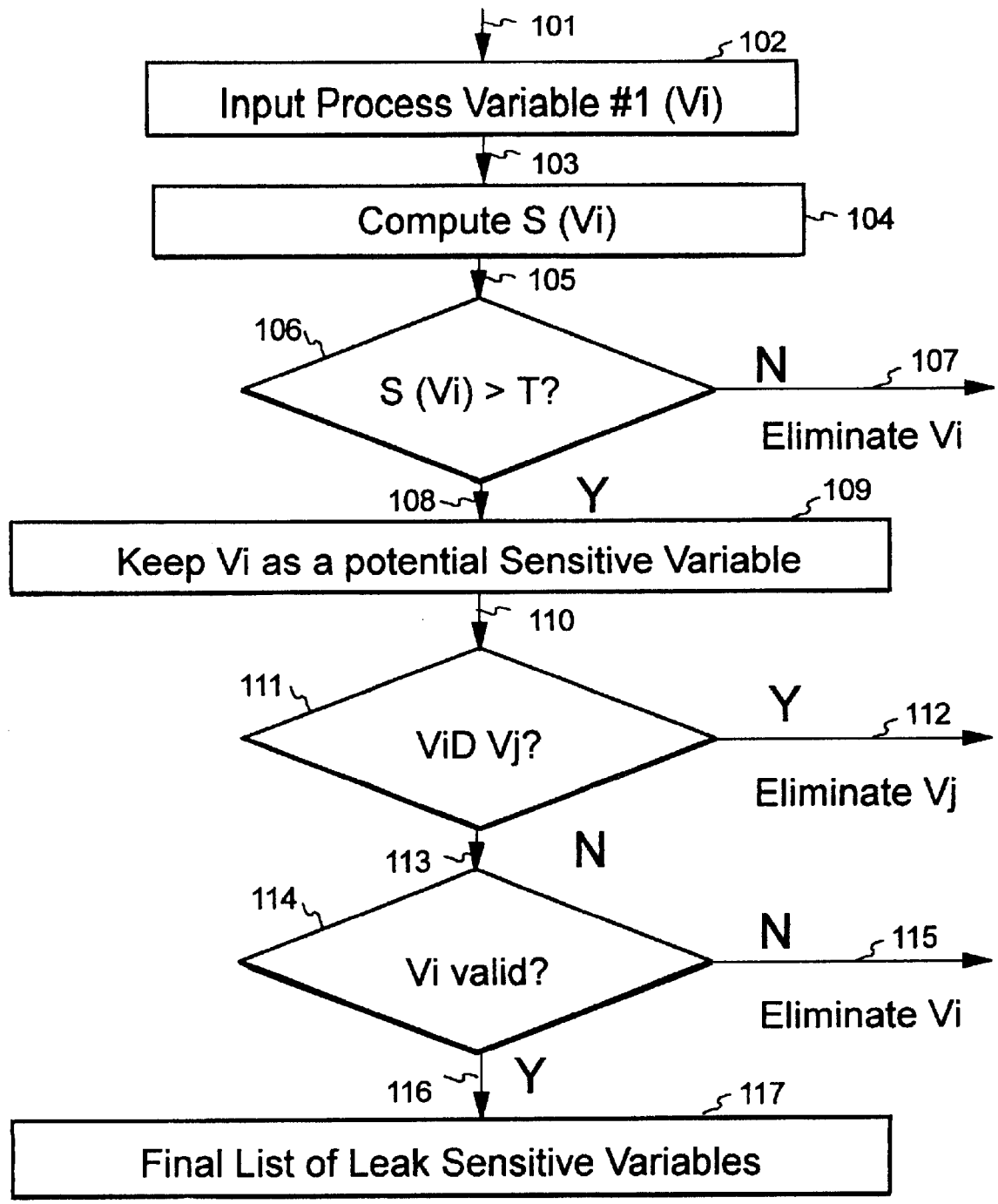
FIG. 1 is a logic flow chart representing the movement of the program logic through the process of identification of leak sensitive variables. As may be appreciated, all the variables of the instant process are first input via line 101 into data acquisition block 102 or alternatively first storage block 102 wherefrom each variable input therefrom is moved via line 103 into variable compute block 104 wherein the sensitivity, or more particularly, the sensitivity function of each such variable is computed and evaluated. Subsequently, the resulting value for the sensitivity function of each particular variable is moved via line 105 to comparison block 106 wherein it is compared to a threshold value. Still subsequently, each variable which does not pass the threshold test(s) is eliminated via line 107 whereas each variable which passes the threshold test(s) is moved via line 108 to second storage block 109. It will be appreciated that once the first set of leak sensitive variables is collected in second storage block 109, each such variable is examined from the sense of redundancy. Accordingly, each variable in second storage block 109 is subsequently moved via line 110 to redundancy block 111 wherein any two variables which correlate and which contain similar information about a particular leak event are subjected to a redundancy test wherefrom one thereof is eliminated via line 112. This step is a necessary one in order to limit the number of variables which are to be used in the instant, new and novel leak detection system so as not to adversely effect the performance of same. As will be noted in later discussion, up to this point all the decisions made by said instant leak detection system by means of the flow of program logic, are data driven and are sans the requirement or need for any input of human judgment. Subsequently the independent sensitive variables identified in redundancy block 111 are moved via line 113 to interpretation block 114 wherein they are tested with input of human judgment to ensure that, indeed, they are physically dependent on the tube leak event. Thereafter those variables which do not pass the validation test in interpretation block 114 are eliminated via line 115, whereas those which pass the validation test are moved via line 116 to third storage block 117 for later use in tube leak detection operations. The instant program logic flow described above may utilize any convenient transfer means to move the program logic from one block to another. Accordingly, the references to line numbers, such as, for example, line 116 is not to be construed in any limiting manner. Although not shown in FIG. 1, it will be readily appreciated by those skilled in the art that an additional information collection means or storage block may conveniently be disposed between redundancy block 111 and interpretation block 114, i.e. in line 113, so that the sensitive variables which pass the redundancy test may be collected and more conveniently later validated in the operation of interpretation box 114 by human input thereto for making the necessary comparisons with such changes in those variables with the standard of principles of thermodynamics and mechanics.
Figure 6:
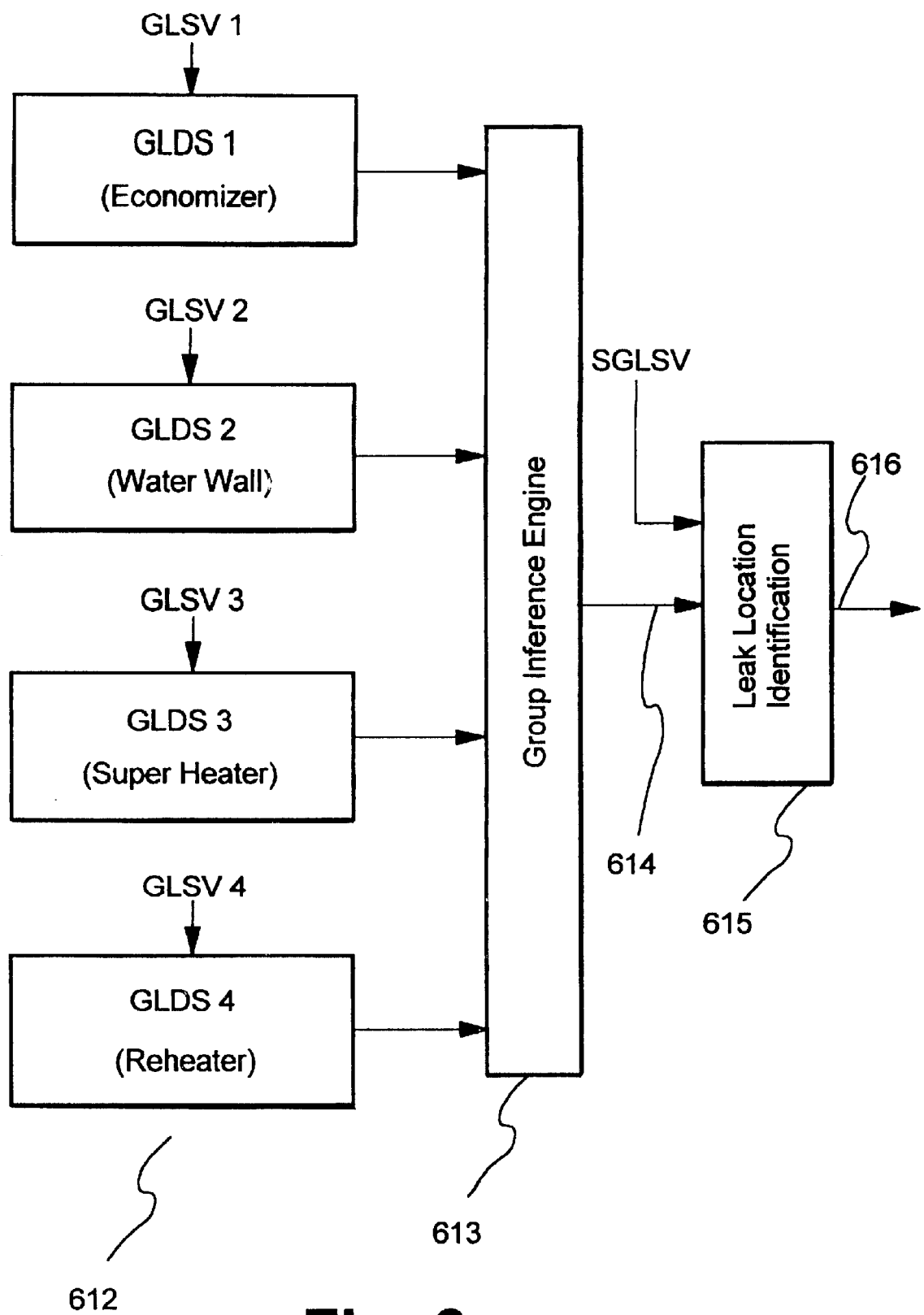
In FIG. 6 there is illustrated the architecture of an ANN based tube leak detection system comprising the second embodiment of the instant invention. As will be appreciated from a more detailed description, infra, the first embodiment of the instant invention which is generally illustrated in FIG. 2, supra, proved to be very suitable for tube leak detection in modern industrial boilers wherein a large number of process variables are inherently monitored. In embodiment one, eleven likely boiler locations can be monitored with some twenty-three process sensitive variables being required by that system, i.e., three ULSVs and twenty LLSVs. Subsequent to confirming the use of the reliability of said first embodiment, the development of the instant invention was directed to an early tube leak detection system more suitable for use in older boilers where a considerable lesser number of variables are monitored because of the considerably less instrument sophistication associated therewith. Accordingly, in embodiment two of the instant invention, the ANN based detection system was conveniently arranged whereby the likely locations of a tube leak in such older boilers was divided into four groups or four subsystems. The occurrence or presence of a leak is monitored for each of these groups and the detection in a group is dependent on the instant new concept built around group leak sensitive variables (GLSV) which are herein shown as GLSV 1 through GLSV 4 which are inputted into the four systems represented generally at 612 and comprise four group leak detection systems (GLDS),. i.e., GLDS 1 through GLDS 4: economizer, waterwall, superheater, and reheater. The output of the four subsystems comprising GLDS 1 through GLDS 4, are delivered in parallel to inference engine 613, wherefrom, for instance, a level of zero indicates no leak present in a particular group. It will be appreciated that the procedure used herein for identification of the different variables utilizes the procedure taught for operation of the logic flow chart illustrated and discussed in FIG. 1, supra, except that instead of the threshold value used for either of the ULSVs or the LLSVs compared in comparison block 106, a threshold value specific to GLSVs is utilized. Once inference engine 613 declares a leak to be present in a particular group, via output line 614, the other groups will not be further considered, i.e., only that particular group -will be further analyzed. It should, of course, be appreciated that each subsystem in a particular group is in turn divided into a set of subgroups. For example, the superheater is divided into the primary superheater (SGL 11) and the secondary superheater (SGL 12). Likewise, the reheater is divided into a set of subgroups comprising the primary reheater (SGL 41) and the secondary reheater (SGL 42). Since the mechanics and construction of the economizer and the waterwall are such that the location of a leak event occurring is readily ascertainable once ingress thereto is effected, as for example, for purposes of observation or correction, it has been determined that these two areas of the boiler do not require further subdivision thereby resulting in a situation wherein a group designated as GL 1 and the subgroup designated as SGL 1 for the economizer and wherein the group designated as GL 2 and the subgroup designated as SGL 2 for the waterwall are one and the same. To identify the location of the leak within that particular subgroup, the concept of subgroup leak sensitive variables (SGLSV) is used as input to 615 where the identification of the leaky subgroup is identified.

More specifically, similar to the determination of the GLSVs in the procedure taught above in conjunction with FIG. 1 and 6, there is also determined by employment of similar procedure, a set of SGLSVs, wherein still a different threshold value is utilized therefore in the operation of comparison block 106 than was the threshold value employed during determination of such GLSVs. In the most preferred arrangement, a relatively small number, usually an average of two of said SGLSVs is associated with each of said four boiler subsystems. To determine which subgroup contains the leak, the SGLSVs of each subgroup are input to ANNs previously trained for handling such input and wherefrom there is output to a subgroup inference engine contained in 615 wherein is determined the particular location of the leak event.

From the above, it should now be appreciated that in the embodiment illustrated in FIG. 6, it is most desirably applied to the detection of boiler tube leak events occurring in vintage, i.e. older style boilers which are not equipped with the more modern-day means for monitoring, detecting, and otherwise transducing a plethora of different events therein. The arrangement in the most preferred embodiment thereof comprises first breaking down parts of the boiler into a number of groups and then ascribing to or further breaking down each such group into subgroups. In this most preferred embodiment, each group comprises, respectively, either the economizer, the waterwall, the superheater, or the reheater, whereas two of such groups are further broken down into or further divided into subgroups comprising each of two locations and the other two groups are not so further divided. Accordingly, the net result may be more easily illustrated by the open tablulation below, wherein it will be seen that the superheater and the reheater are broken down, respectively, into two subgroups comprising the primary superheater, and the secondary superheater and the primary reheater and the secondary reheater, and further wherein the net result is four groups and six subgroups.

Economizer (GL, 1):
   1. Economizer (SG 1)
Waterwall (GL 2):
   1. Waterwall (SG 2)
Superheater (GL 3):
   1. Primary Superheater (SGL 31)
   2. Secondary Superheater (SGL 32)
Reheater (GL 4):
   1. Primary Reheater (SGL 41)
   2. Secondary Reheater (SGL 42)

The SGL locations are detected using SGLSVs. Note that in uncaptioned Table 1, below, the SGLSV numbers are associated with the SGL location numbers.

TABLE 1

| SGLSV 11 | SGLSV 12 | SGLSV 2 | SGLSV 3 | SGLSV 41 | SGLSV 42 |
|---|---|---|---|---|---|
| PBPGX (14) | PBPGX (13) | WDIWS | PBPGX (14) | PBPGX (6) | PBPGX (6) |
| PBPGX (13) | PBPGX (11) | PDA | LFNTLTS (1) | PBPGX (4) | PBPGX (7) |
|  | FFD (1) | PBPGX (14) |  |  | CHWMUVO |
|  | PPRX (2) |  |  |  |  |

As far as the leak detection is concerned; for every GL there is one ANN based GLDS. Given that a leak is detected in a given group, the detection effort will then focus on that group to isolate the location of the leak. For every subgroup of likely leak locations, within that group which is thusly focused upon an ANN detection system is used to detect the leaky subgroup. It will be appreciated that in this design in the most preferred embodiment thereof, an ANN based detection system or detector will be trained and utilized for each of the areas comprising the four main groups. Likewise, an ANN based detector system most preferably will be trained for each of the six subgroups comprising SG 11, SG 12, SG 2, SG 3, SG 41 and SG 42, supra. Two of the six are dual purpose, i.e., the economizer (GL 1) and the economizer (SGL 1) are identical and waterwall (GL 2) is identical with the detection system comprising the waterwall (SGL 2). Accordingly, although there are tour detectors acting for the first group and six for second subgroup, there are in reality a total of eight detectors. As will be appreciated from discussions, supra, touching on the implementation of the instant embodiment by substituting therefore inference engines to do the work of the ANN based detection systems, the same quantitative relationship will hold, i.e., instead of four ANN based GLDSs and six ANN based subgroup leak detection systems (SGLDS) of embodiment two, the more sophisticated version and derivative thereof comprising embodiment four will most preferably employ four group leak inference engines (GLIE) and six subgroup leak inference engines (SGLIE). In either of these embodiments, it will be further appreciated that the number of GLSVs comprising GLSV 1 through GLSV 4 most preferably totals eleven for this design.

Figure 7:
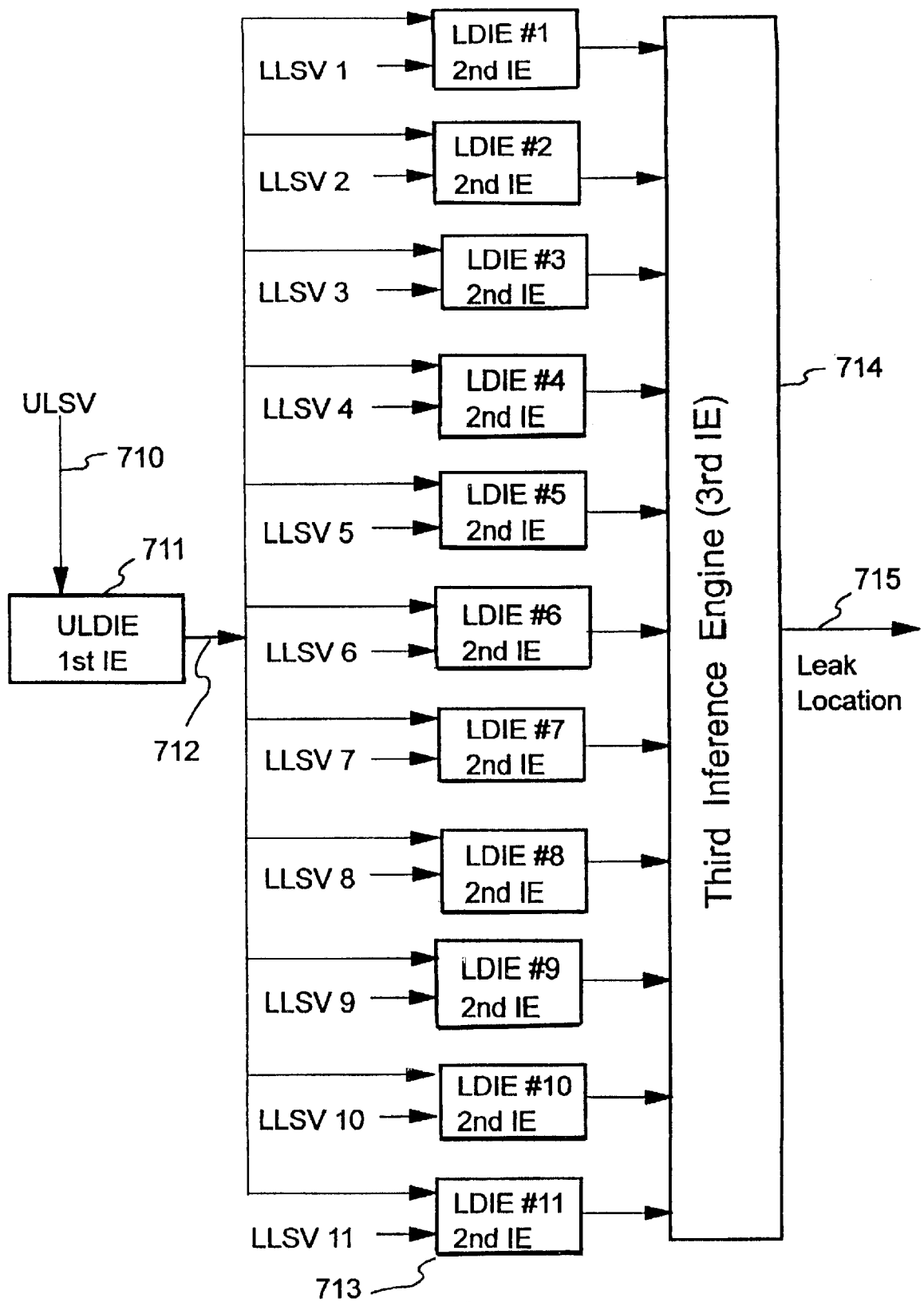
Figure 8:
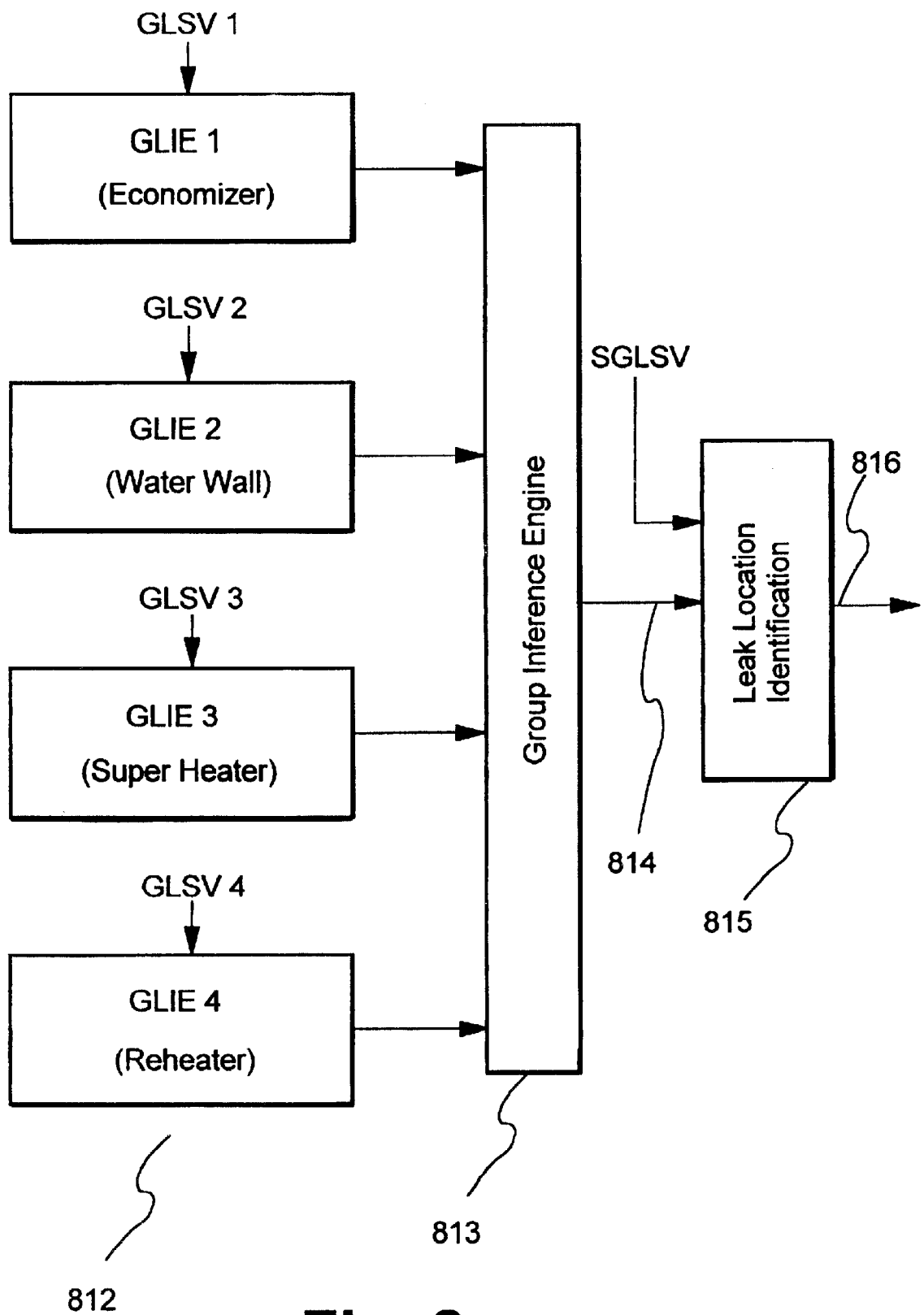

Referring to FIGS. 7 and 8 collectively, therein are illustrated the neural fuzzy based detection systems comprising, respectively, embodiments three and four of the instant invention. More specifically, in regards to FIG. 7, it will be appreciated that embodiment three is patterned after the architecture of embodiment one shown in FIG. 2, supra, wherein the same sensitive process variables information for embodiment one are inputted herein into embodiment three. However, the ANN detectors utilized in embodiment one (to wit, those comprising LLDS 1 through LLDS 11, as the LLDS generally at 213) are replaced in this embodiment three by a plurality of leak detection inference engines (LDIE) comprising LDIE 1 through LDIE 11, and are shown generally at 713. Contrary to the crisp ANN inference engine used in embodiments one and two, supra, the inference engine used in these embodiments three and four is a fuzzy decision maker, i.e., its input and outputs comprise fuzzy variables or qualities linguistically often expressed as, for example, small, medium, and large. To make its decision, an inference engine uses fuzzy logic with its fuzzy knowledge base. The parameters involved in the fuzzy knowledge base are learned using ANNs.

In the ANN based boiler leak detection system comprising embodiments one and two of the instant invention, the output of each ANN detection system is a crisp signal. The inference engine utilized in operative association therewith is a classical expert system which looks at the output of these detection systems (see, for example, the depictions comprising FIGS. 2 and 6) and decides which output corresponds to the leak event.

In the fuzzy logic based boiler tube leak detection system comprising embodiments three and four of the instant invention, the ANN detection systems are replaced with inference engines, as shown, for example as LDIE 1 through LDIE 11 in FIG. 7 and as GLIE 1 through GLIE 4 in FIG. 8. An inference engine comprises a fuzzy inference system which is made up of three components: a knowledge base, which contains a set of fuzzy rules describing the fuzzy map between sensitive variables and the leak; a data base which defines the membership functions used in the fuzzy rules, and a reasoning mechanism, which performs the inference procedure upon the rules and given facts to make a conclusion about the presence of a leak and its size. Because the output of each inference engine is fuzzy, the inference engine is a fuzzy expert system which looks at the output of each inference engine and determines which output corresponds to the leak event. For more detailed information and detail on such fuzzy inference systems, the reader's attention is directed to Yager. R., *Essential of Fuzzy Modeling and Control*, John Wiley, 1994; Terano, T., *Applied Fuzzy Systems*, AP Professional, 1989; and, Kosko, B. *Fuzzy Engineering*, Prentice Hall, 1997, the teachings and disclosures of which are hereby incorporated by reference thereto.

It will be appreciated that each of the LDIEs, shown generally and collectively at 713, uses as a knowledge base, a fuzzy map.between a leak in a given location and the set of appropriate sensitive variables, with said map being modeled by a set of "If Then" rules. Accordingly when tube ULDS block 711 (most preferably, a first inference engine) receives input of ULSVs via line 710, it produces a fuzzy output which herein, for example, was conveniently in the form of zero, small, medium, or large for the first stage determination of whether or not a leak is present in the boiler. As structured in the instant invention, when such output is either medium or large, the occurrence of a leak event in the boiler is declared and all of the LDIEs comprising, as shown, eleven separate second inference engines, LDIE 1 through LDIE 11, respectively, and generally shown at 713 begin to estimate the location of the leak with their outputs being sent in parallel to inference block 714, i.e., the third inference engine, for final determination by output via line 715, said determination being effected in a fashion similar to the determination discussed in FIG. 2, supra.

In the architecture of the instant, new and novel fourth embodiment of the instant invention as represented in FIG. 8, the same GLSVs. i.e., GLSV 1 through GLSV 4, which were utilized in the practice of the second embodiment of the instant invention and referred to in the discussion of FIG. 6, supra, are inputted to a plurality, herein shown as four separate GLIEs comprising GLIE 1 through GLIE 4 and generally located at 812, rather than to the ANN based GLDSs as utilized in the second embodiment of the instant invention and depicted in FIG. 6, supra. As in the practice of the first step of the instant second embodiment an output level from each of said four separate GLIEs is input to second group inference engine 813 via line 814 wherein a level of zero indicates no leak is present in any particular group. Again, as in or similar to the practice employed in the second embodiment of the instant invention, it will be appreciated that the procedure used herein for identification of the different variables utilizes the procedure taught for operation of the logic flow chart illustrated and discussed in FIG. 1, supra. Once second group inference engine 813 declares a leak to be present and identifies the particular group with which it is associated via line 814, the more specific location within that group so identified is determined with the concept of SGLSVs herein illustrated at 815 and again, determined similar to the procedure described in FIG. 1, supra, wherefrom is outputted via line 816 the location of the leak. The rest of the procedures for identifying the leak location follows the procedures given above for embodiment two. As explained in greater detail, infra, there are preferably provided one (not shown) first subgroup inference engine corresponding to each respective first group inference engine with at least one input thereto of a corresponding SGLSV. Since second group inference engine 813 identifies just which group the leak event is occurring in, thereafter only that particular first subgroup inference engine need be utilized to more specifically locate its position in the boiler.

Figure 9:
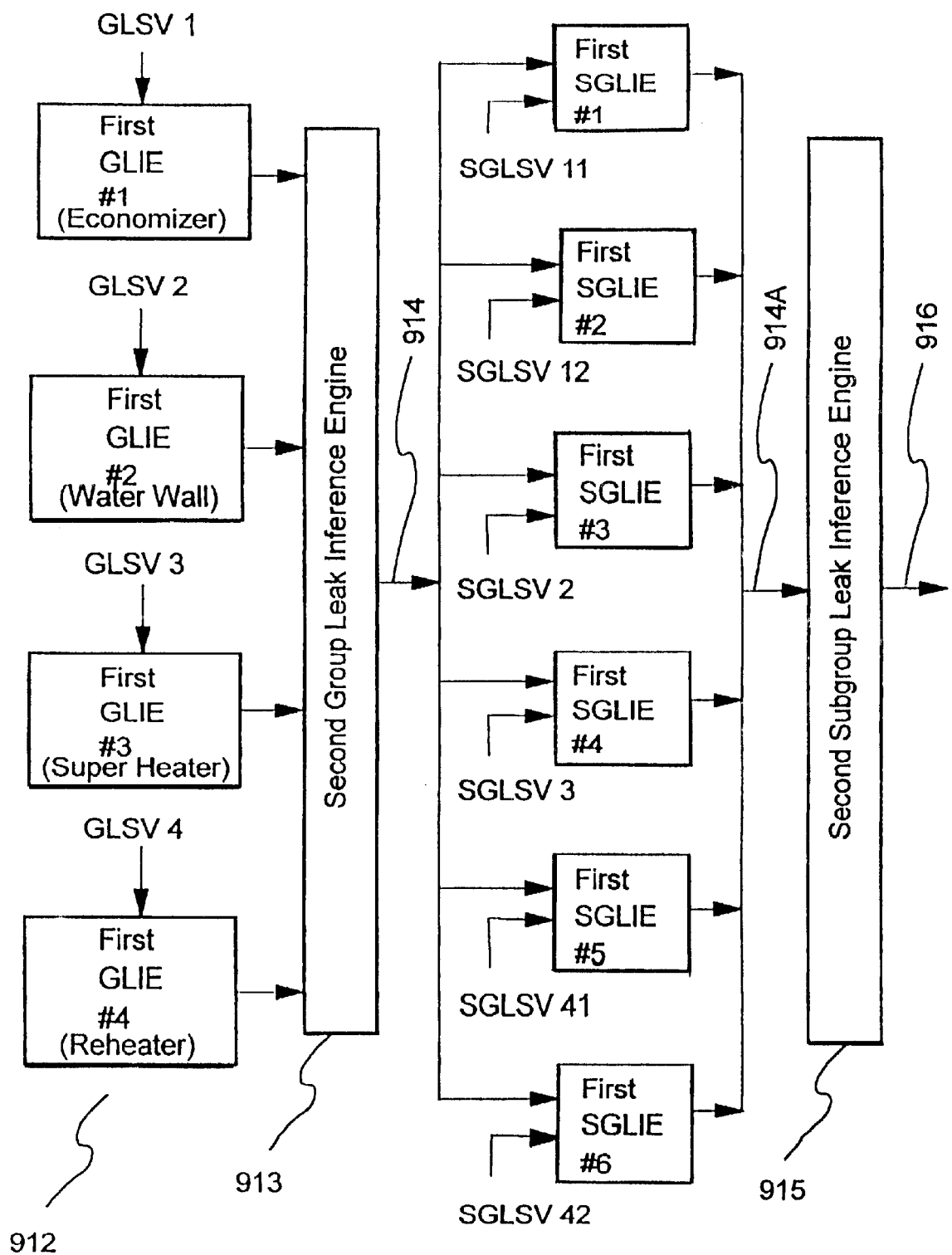

In FIG. 9, there is illustrated the architecture used in FIG. 8, but in much greater detail than is shown in said FIG. 8.

DESCRIPTION OF THE PREFERRED EMBODIMENTS

IN COMBINATION WITH A DETAILED DESCRIPTION OF THE DRAWINGS, SANS FIGS. 4 AND 5

For the sake of clarity and a better understanding of the applicability of the illustrations of the various drawings, a more detailed description of same is given below in combination with the teachings of the herein preferred embodiments of the instant invention.

Identification of Boiler Tube leak Sensitive Variables. Industrial boilers are normally provided with attendant instrumentation designed to measure the so-called process variables. These process variables include, among other parameters, combustion airflow, steam pressures and temperatures at different points of the boiler, etc. Measurement of these process variables are necessary for purposes of boiler control and monitoring. When a leak takes place in a boiler tube(s) some of these variables exhibit significant changes in response to the leak event. The first step, or stage, in the practice of the instant invention is to identify these process variables, which for the sake of convenience, arc herein termed leak sensitive variables (ISV). The "gist" underlying the principle of this approach comprises assuming no a priori knowledge about the identification or characteristics of these sensitive variables. Accordingly, this approach is initially data driven. Such direction, of course, is necessary to allow for automatic design of the first phase or stage of the instant, new and novel detection system wherein no expert human input is required to perform such identification of these LSVs. However, once the LSVs are identified, interpretation, including expert human input is utilized to correlate, compare, and identify the final list of LSVs.

Accordingly, the first step in the first stage of the instant identification process was to select criterion required to quantify the sensitivity of a given process variable to the occurrence of a leak event. The relationships herein initiated to so quantify the sensitivity of a given process variable is herein termed the sensitivity function ($S(v_i)$) as herein given below.

$$S(v_i)=abs(\Delta v_i/\Delta_i)$$

Where $\Delta v_i$ represent the change in the process variable in response to a change of in the occurrence and/or magnitude of a tube leak $\Delta l$ and abs denotes the absolute value thereof The reason for using such absolute value is due to the fact that, in response the occurrence of a leak event, some LSVs such as the combustion airflow exhibit an increase in value (in this case $\Delta v_i$ is positive), while on the other hand, the ID fan suction pressure exhibits a decrease in value (in this case $\Delta v_i$ is negative). The sign of the change is irrelevant for performance of the instant sensitivity analysis. Note that other sensitivity functions may be used as, for example, the relative change of the process variable:

$$S(v_i)=abs(\Delta v_i/v_i)$$

Given the data which has herein been recorded for the boiler variables and the corresponding leak level and location, the sensitivity computation is performed in the order of the steps illustrated in the logic flow chart of FIG. 1.

Referring now more specifically to FIG. 1, the process variables $\Delta v_i$, i=1, 2 . . . , m are input via 101 into data acquisition system 102 or first storage block wherefrom each is moved via line 103 to sensitivity evaluation block 104, wherein the sensitivity of each leak process variable is computed. The resulting value of the sensitivity function for each leak process variable is then moved vial line 105 to comparison block 106 wherein it is compared to a threshold T. The value of T is determined using statistical analysis, the results of which are modified by incorporation of the instrumentation accuracy factor wherein, because of certain inherent errors resulting from measurement, a given LSV may exhibit a certain degree of fluctuation, called measurement error. The set of LSVs which do not pass the threshold test are eliminated via line 107, whereas those that pass this threshold test are transferred via line 108 to second storage block 109. Once the first set of LSVs is obtained, the next task is to eliminate those of these saved LSVs which are redundant. This elimination test is accomplished in redundancy analysis block 111 upon LSVs being transferred thereto via line 10. If two variables are correlated in redundancy analysis block 111, as being dependent on each other, it may be deduced that they contain similar information about the leak; and, accordingly one of them must be eliminated as, for instance, via line 112. This elimination process is necessary in order to limit the number of variables which must be used by the instant, new and novel detection system. For example, if the pressure variation at one end of a tube is known, one can determine the pressure variation at another end of the tube. Therefore, only one pressure required in order to ascertain the pressure in both ends. The decision making logic employed in redundancy analysis block 11 as to whether or not two LSVs are dependent upon each other looks at the response of the two variables to the same leak. If the response of one variable can be deducted from the second, only one of those variables is kept. Otherwise, the two variables are not dependent and both should be kept. It will now be appreciated that up to this stage of program logic movement, in the identification of boiler tube. LSVs, all the decisions reached were data driven. No human judgment input was used in the processing of any of the previous steps. Subsequently, the independent sensitive variables which are determined not to be redundant are moved from redundancy analysis block 111 via line 113 to physical interpretation block 114 where they are thereafter tested using expert human input or the principles of thermodynamics and mechanics to determine if they are physically dependent of tube leaks. The principal object of this operation is to ensure that each LSV in the resulting final list can be shown to be physically correlated to a boiler leak event. For example, when a tube leaks, its pressure must go down. Thereafter, those LSVs which do not pass the physical validation test are eliminated via line 115, whereas those which pass such physical validation test are transferred via line 116 to third storage block 117 to be used later for tube leak detection. It is worth noting that the last test is only needed to increase the confidence level in the instant, new and novel identification scheme. For instance, if enough data is available to repeat the test many times and if the sensor data is of reasonable quality, physical interpretation block 114 would not be required. The final list in third storage block 117 constitutes the set of LSVs and represents the information source used by the instant tube leak detection systems which use will be discussed in greater detail, infra. As noted supra, although not shown in FIG. 1, it will be readily appreciated by those skilled in the art that an additional information collection means or storage block may conveniently be disposed between redundancy block 111 and interpretation block 114, i.e., in line 113 so that the sensitive variables which pass the redundancy test may be collected and more conveniently later validated in the operation of interpretation box 114 by human input thereto for making the necessary comparisons with such changes in those variables with the standard of principles of thermodynamics and mechanics.

It should be appreciated that this list of LSVs in third storage block 117 may contain not only the ULSVs, but also the LLSVs, the group LLSVs and/or the subgroup LLSVs. These four classes of sensitive variables will also be discussed in greater detail later. Given all the available boiler process variables, the LSVs will be recorded whenever a leak takes place. Such recorded data, called training data, will be used to train the ANNs used herein for leak detection. It is also worth noting that, contrary to acoustic based detection systems, the instant, new and novel method, technique, and system(s) does not require any new instrumentation to be added to an operating boiler since it uses only already monitored process variables.

Design Philosophy. When a boiler tube starts to leak, the sensitive variables start to change in response to that leak event. For example, there has been observed both an increase in draft loss and steam temperature in response to a leak. It is also worthy of note that such variables may also change as a result of other phenomenon such as changes in boiler loading due to changing requirements for steam output. The significance of change due to such other factors is referred to in greater detail, infra. From the perspective of information collection or storage the variation of the LSVs in response to a leak event is the principal source of information upon which the instant invention and in particular, the first embodiment thereof makes a decision about whether or not there is a leak event, and if so, where in the boiler the leak is located. At the outset of making the instant invention, the challenge was how to recognize a leak event based upon information relating to the changes of those variables. It was discovered that in order to find a solution to this problem, the correlation between just how a tube leak in a given location affects the so-called sensitive variables must be determined. Therefore, the principal consideration required for effecting an effective solution to the instant tube leak detection problem is to first build, create, or otherwise assemble and thereafter learn the map interlinking the interdependent parameters comprising the appropriate LSVs, the presence of a leak, and the location of that leak.

To assemble or provide and thereafter learn such a map, several tools are available. For instance, classical identification techniques could be used. However, this tool is based upon a model-based approach and requires a priori knowledge of the form of the map between the leak and the sensitive variables. Given the likely complexity of this map, providing the correct functional form a priori may not be a trivial task. The second tool employs the use of model-free estimators to learn the map. Here ANNs come in handy. The ANN, once appropriately trained will contain the desired map between LSVs, the leak size, and the leak location. ANNs operate on data and learn by examples. Its logic is the so-called crisp logic and the map learned by the ANN will be a crisp map. Since the sensitive variables are measured with sensors or transducers whose outputs are not technically perfect, such measurement information or output is expected to be cluttered with background acoustical noise. Accordingly, an amount of preprocessing of such sensor output information is required before the measurements of the sensitive variables can be effectively used by the instant ANN based detection system.

The second embodiment of the instant invention employs a somewhat modified design philosophy from that described above for the instant first embodiment. This second embodiment is designed for use, for example, on older style fossil fuel plant boilers which were designed to operate on considerably less monitoring and instrumentation. The systems and methods employed in the practice of the third and fourth embodiments of the invention are able to operate on noisy data and incomplete information through the utilization of approximate reasoning. Approximate reasoning as described and used herein employs fuzzy logic. Approximate reasoning requires a knowledge base. To acquire such knowledge boiler data is used to learn the so-called fuzzy map between the LSVs, the leak level, and the location of a leak. The fuzzy modeling consists of a set of "If Then" rules which use fuzzy sets. To characterize these fuzzy sets, an ANN is used in connection with plant data to identify the parameters of these fuzzy sets. More detailed information about the identification of these tube may be found in T. Zhong, A. T. Alouani, and R. A. Smoak, "On The Identification Of Sensitive Variables Of Boiler Tube Leaks," Proc. 29th IEEE Southeastern Symposium on Systems Theory, Cookeville, Tenn., March 1997.

Embodiment One of the Instant Invention Comprising an ANN Based Tube Leak Detection System. In this first design of the instant, new and novel boiler tube leak detection system, the problem of early tube leak detection is approached and solved in two steps. In the first step, the determination is made as to whether or not there is a leak event anywhere in the boiler. Once a leak event is confirmed, the second step practiced is to determine its location.

In order to determine whether a leak is present in the boiler, the concept of universal leak sensitive variables (ULSV) is introduced. ULSVs are process variables which respond to most leak events which occur in the several different locations of a boiler. The list of ULSVs is given in Table 2 below.

TABLE 2

List of Universal Leak Sensitive Variables

| VARIABLES | MEANING |
|---|---|
| WDIWS | COLDWELL TANK MAKEUP FLOW |
| FFD(2) | COMBUSTION AIR FLOW A1 |
| PPRX(2) | ID FAN A INLET SUCTION PRESS |

Figure 2:
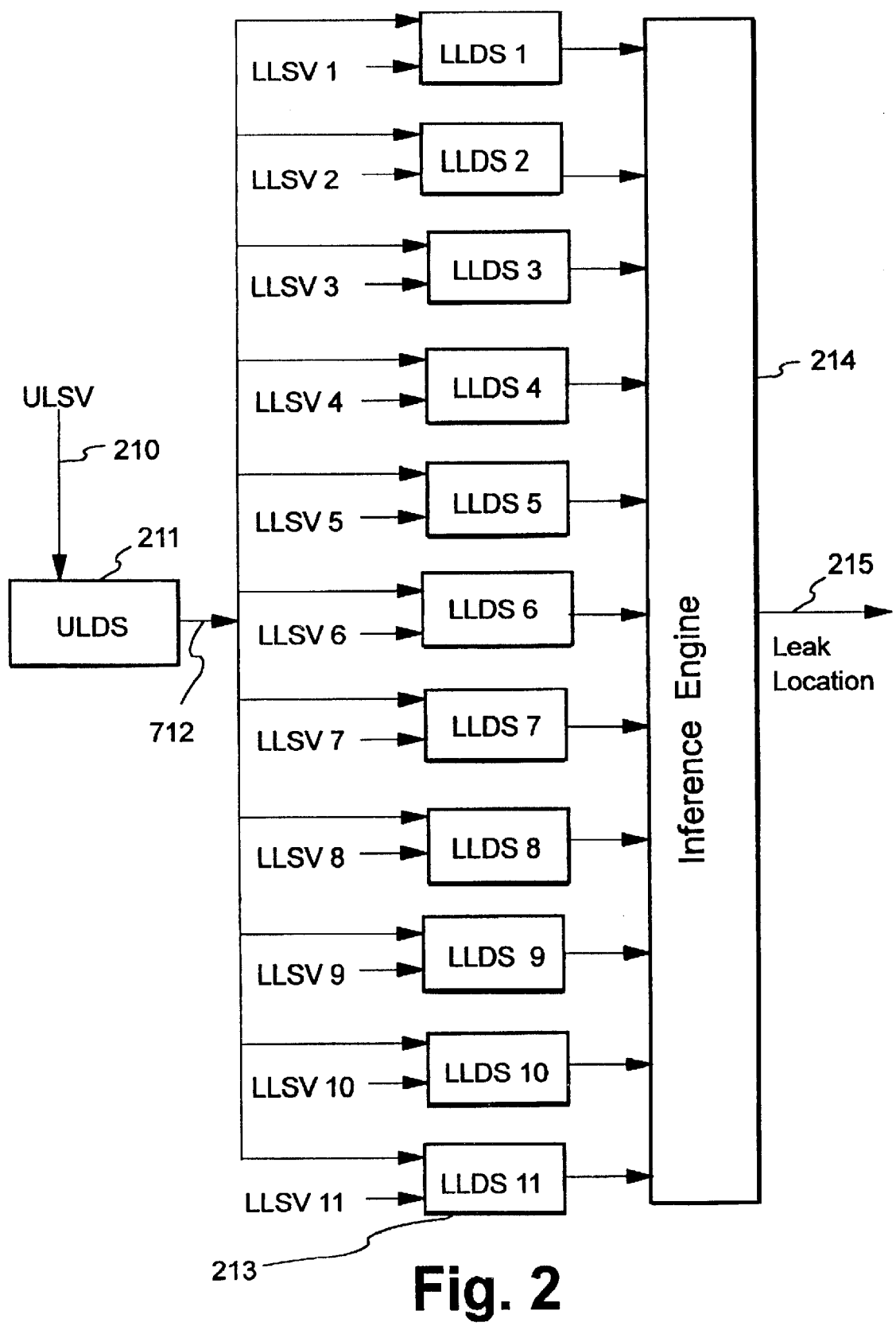
In FIG. 2, there is illustrated in block diagram format an ANN based detector system designed according to embodiment one of the instant invention. As may be seen, universal leak sensitive variables (ULSV) are input via line 210 to tube universal leak detection system (ULDS) block 211. In the first stage of utilization of this instant, new and novel system, a determination is made as to whether or not a leak is present. Thus, and just for example, when the output via line 212 of ULDS block 211 is zero, no leak is present in the boiler whereas when the output of block 211 is one, a leak is present. Thereafter, when a leak event is declared to be present in the boiler by such output from block 211, the next step utilized in the practice of the instant, new system is to determine the location of such leak in the boiler. This is accomplished by the use of a plurality of ANN based local leak detection systems (LLDS) herein illustrated generally at 213 and identified generally as eleven blocks comprising ANNs LLDS 1 through LLDS 11. It will be appreciated that one of each of the ANNs comprising 213 is utilized to represent each location in the boiler where it has been previously determined that a leak is likely to take place. As may be further appreciated, the input to each LLDS is its corresponding set of local leak sensitive variables, i.e. herein shown as LLSV 1 through LLSV 11. The output from each of the eleven LLDSs represents a leak level wherein, for example, a level of zero indicates no leak is present. It should be further appreciated that the decentralized structure of this system allows for each such of LLDSs to operate simultaneously since they operate in parallel, one from another. It will be still further appreciated that before such parallel activity may be utilized, each of the eleven ANNs must first be trained. Details on such ANN learning or training are discussed in the section below dealing with "Description of the Preferred Embodiments."

Referring now more specifically to FIG. 2, it may be appreciated that the ULSVs will be used as input to an ANN based detector, called a tube ULDS and identified at block 211, the output of ULDS block 211 is zero when no leak is present in the boiler and one whenever a leak is present. More detailed information relating to such ULDS is found in T. Zhong, A. T. Alouani, and R. A. Smoak, "ANN Based Tube Leak Detection System," Proc. 29th IEEE Southeastern Symposium on Systems Theory, Cookeville, Tenn., March 1997. As noted above, once a leak event is declared, the second step for practice of the instant invention is to determine its location in the boiler. For this reason the concept of local leak sensitive variable (LLSV) has been introduced into the teachings, practice, and operation of the instant, new and novel invention. A LLSV is a variable whose response to a leak in a given location is much higher than in any other location. For each and every location in a boiler which has been determined and identified in the practice of the instant invention to be a likely location where a tube leak may take place, the procedure taught in FIG. 1, supra, is used to identify independent LLSVs. Then for every such location an ANN based detector, herein termed, for convenience, a LLDS, is designed to detect the leak event whenever it occurs in that particular location. Referring again to FIG. 2, the input to each of the LLDS: shown generally at the eleven blocks comprising 213, i.e. from LLDS 1 through LLDS 11, is the corresponding set of relevant LLSVs (i.e. LLSV 1 through LLSV 11, respectively). The amplitude of output of each of the LLDSs is the leak level, wherein a level of zero indicates no leak is present in that location. Once ULDS block 211 declares the occurrence of a leak event, all local leak detector systems, LLDS 1 through LLDS 11, comprising the blocks at 212 initiate a search for its most likely location. It will be appreciated by those skilled in this art that the architecture of the instant, new, and novel system provides that, after ULDS block 211 declares a leak event, each of the plurality of LLDSs, from LLDS 1 to LLDS 11 operate simultaneously in parallel, one to the other.

All of the ANNs used in said first embodiment have one input layer, two hidden layers, and one output layer. The input layer conveniently has three neurons, the first hidden layer has forty neurons, the second hidden layer has twenty-four neurons, and the output layer has one neuron. All such ANNs use the back propagation algorithm for training.

For a better understanding of just how the instant, new and novel ANN based tube leak detection system operates, consider a procedure wherein data recorded for a given leak event included information of the ULSVs in Table 2, supra, which was usually taken for a period of time determined to be convenient and reliable, herein preferably some 15 days, to train the ANN comprising ULTDS block 211. It is noted that this is, and was accomplished as follows. Given the variation of the tube leak over a time interval, $\Delta t$ (typically 5 min), the variation of the ULSV, $\Delta v_i$, i=1, 2, 3, is computed from the 15 days of recorded data, supra. The process is repeated until all the data is used. At the end of this process, all the $\Delta v_i$, i=1, 2, 3, and the corresponding $\Delta l$ are stored in an input array and an output array, respectively. Such arrays constitute the training data for the ANN comprising ULDS block 211. The ANN is then trained with this data until the learning error diminishes and stays below a threshold of 0.0001. Once the training is completed, the weights and biases obtained are stored and later used for detection.

Figure 3:
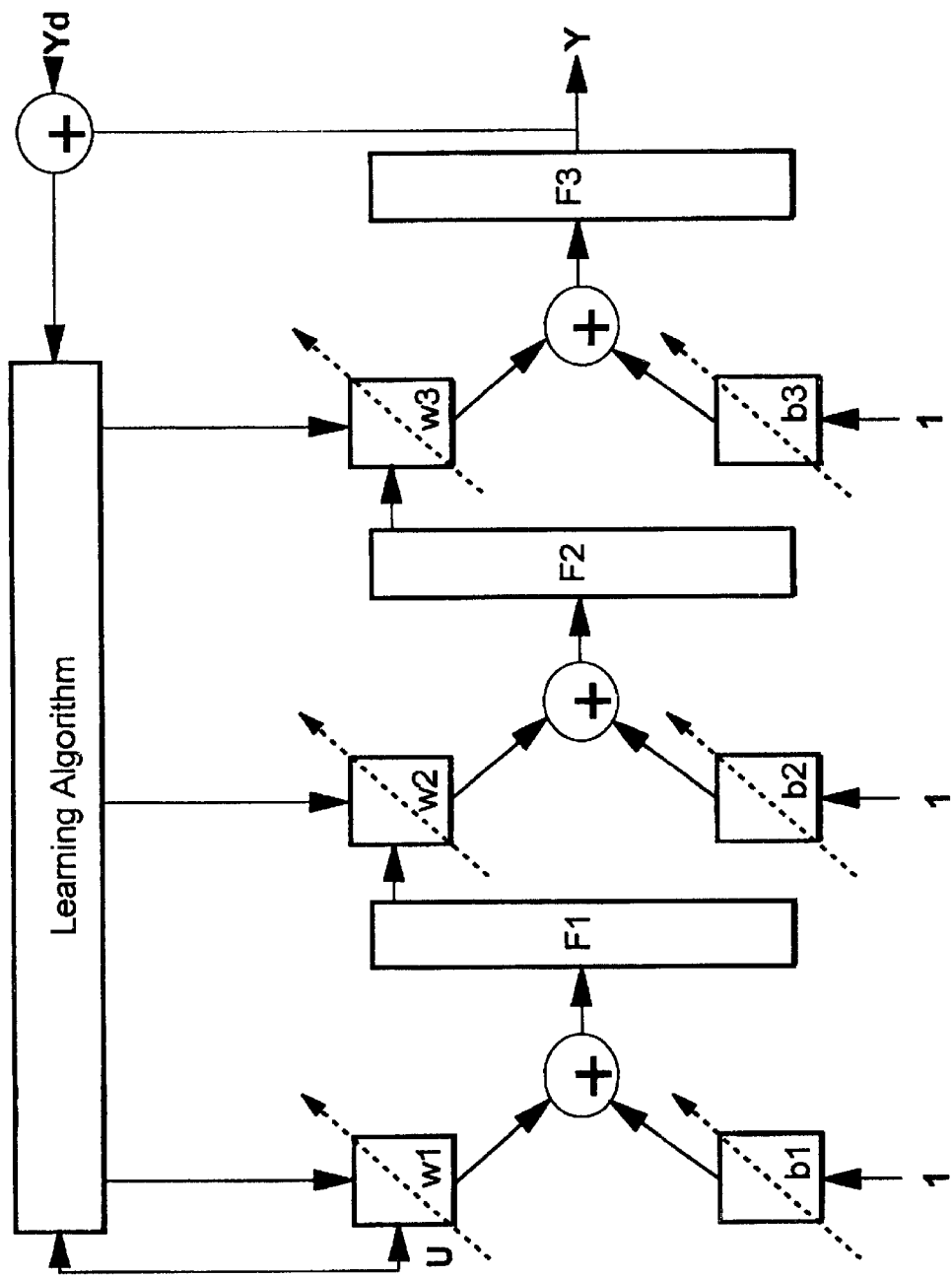
In FIG. 3 there is illustrated the architecture used for the ANNs herein utilized for purposes of boiler tube leak detection. Each such ANN has a single input layer and a single output layer, and in the most preferred embodiment thereof, two hidden layers. The blocks identified as F1–F3 represent sigmoids of the ANN wherein training thereof comprises adjusting the weights w1–w3 and the biases b1–b3 of the ANN until output Y matches input Yd. The value of biases b1–b3 are initiated to "1." Then the learning algorithm will adjust such bias as part of the learning process. See, for example, Table 5, infra. As noted, the ANN architecture utilized in the most preferred embodiments of the instant invention have a single input layer with two hidden layers and one output layer. Preferably, the input layer comprises three neurons, since it has been determined that three ULSVs are sufficient for determining if a leak event is occurring. If a greater or lesser number of ULSVs is desired, the number of neurons in said input layer may be adjusted accordingly. The first hidden layer preferably comprises forty neurons and the second hidden layer twenty-four neurons. It will be appreciated from a more detailed description infra that, since the single input layer has three inputs. w1 is represented by a 40×3 matrix, whereas w2 may be represented by a 40×24 matrix, and w3 may be represented by a 24×1 matrix, or more correctly a 24×1 vector. The corresponding biases, to wit, b1 may be represented by a 40×1 vector, b2 represented by a 24×1 vector, and b3 represented by a single value.

Referring now more specifically to FIG. 3, the input U of the ANN is given by:

$$U=[\Delta v_1 \ \Delta v_2 \ \Delta v_3]$$

$$\Delta v_1 = v_1(t_1) - (t_2)$$

$$t_1 - t_2 = 5 \text{ min } s$$

The output Y of the ANN is the leak variation due to the input U. The signal Yd is the target leak variation, i.e., for a given U there is a corresponding Yd which was obtained from actual operation of the boiler or, alternatively, it may be obtained as simulation data. The training consists of adjusting the weights (w1, w2, and w3) and biases (b1, b2, and b3) of the ANN until Y matches Yd. As long as Yd is not equal to Y, an error signal e=Yd−Y is formed and used to adjust the parameters (weights and biases) of the ANN. In FIG. 3, the block F1, F2, and F3 are sigmoids of the ANN. Again, and for example, referring to the particular operation of ULDS block 211 in FIG. 2, the training parameters used for ANNs of the type, illustrated in FIG. 3 are given below in Tables 3–6, it being understood that the matrices and vectors shown are illustrative and are not intended to be limiting of similar matrices which conveniently may be utilized for the instant invention to adjust weights and biases of other like ANNS. Note that Table 3 represents a 40×3 matrix, i.e. three input variables, one each to the three neurons in the input layer, which three neurons are in turn connected with the forty neurons in the first hidden layer. Table 4 represents a 40×24 matrix, i.e., forty neurons in the first hidden layer connected with twenty-four neurons in the second hidden layer. Table 5 represents a 24×1 matrix, or more correctly, a 24×1 vector, i.e., twenty-four neurons in the second hidden layer in weights of connection between same and the one neuron in the output layer. Table 6 represents the bias values of the neurons used by the ANN.

TABLE 3

Tube Universal Leak Detection System Weight W1 Matrix

| | | |
|---|---|---|
| −6.8105 | 0.1830 | 0.0084 |
| 0.3421 | −0.0835 | −1.4036 |
| 0.4772 | 0.0646 | 6.3625 |
| 0.6104 | −0.0061 | −1.6130 |
| −0.1262 | −0.0562 | 11.8071 |
| 0.1153 | 0.0877 | −9.9972 |
| −0.0612 | 0.0186 | −9.5827 |
| 0.1654 | −0.0499 | −1.5191 |
| 0.2763 | −0.0829 | −9.9653 |
| −0.4789 | −0.0210 | −7.8367 |
| 0.1722 | 0.1217 | −0.0732 |
| 0.1993 | 0.0194 | 4.8121 |
| −0.2215 | 0.0263 | −6.0527 |
| 0.3517 | 0.0992 | 6.6523 |
| 0.2443 | −0.0891 | 6.1700 |
| 0.4451 | −0.1021 | 0.4342 |
| −0.3198 | 0.0673 | −7.3625 |
| 0.2749 | −0.0777 | 2.7059 |
| −0.2872 | −0.0236 | −6.5131 |
| −0.3797 | 0.0953 | 2.0727 |
| 0.1964 | 0.0710 | −3.2275 |
| −0.1660 | −0.0673 | −9.0968 |
| 0.2178 | −0.0528 | 6.7786 |
| −0.7184 | 0.0301 | 2.8051 |

TABLE 3-continued

Tube Universal Leak Detection System Weight W1 Matrix

| | | |
|---|---|---|
| −0.4700 | 0.0904 | 0.3274 |
| −0.0161 | −0.0958 | 8.5316 |
| 0.3651 | 0.0325 | 8.7681 |
| −0.1717 | −0.0825 | 5.8704 |
| −0.4336 | 0.0087 | 4.6249 |
| −0.1582 | 0.0887 | −0.5091 |
| −0.4896 | 0.0638 | −8.5882 |
| 0.1230 | 0.0652 | 6.2618 |
| 0.3068 | 0.0029 | −8.6258 |
| 0.3348 | −0.0832 | −8.5491 |
| 0.2013 | 0.0946 | −8.0004 |
| −0.1078 | 0.0576 | −7.8817 |
| 0.3413 | −0.0113 | 0.6119 |
| −0.3323 | 0.1151 | −6.0921 |
| −0.0459 | 0.0019 | −3.3405 |
| 0.1767 | −0.0253 | −7.5726 |

TABLE 4

Tube Universal Leak Detection System Weight W2 Matrix

| | | | | | | |
|---|---|---|---|---|---|---|
| 0.0738 | 0.0071 | 0.1802 | −0.1672 | 0.0116 | 0.0198 | −0.0789 |
| 0.0287 | 0.0547 | −0.1131 | 0.1385 | 0.1301 | 0.1384 | −0.0142 |
| −0.1465 | 0.0054 | 0.1891 | −0.1117 | −0.1385 | 0.0593 | 0.0522 |
| 0.0072 | −0.1133 | 0.1827 | −0.0055 | 0.2204 | 0.0493 | −0.0898 |
| −0.0510 | 0.2296 | −0.10323 | 0.1120 | −0.1451 | 0.1744 | −0.0010 |
| 0.0567 | 0.0986 | 0.1006 | 0.1626 | 0.0402 | 0.0507 | 0.0166 |
| −0.1419 | −0.0829 | −0.1836 | −0.1017 | −0.0088 | 0.1494 | 0.0819 |
| 0.1841 | 0.0815 | 0.1144 | 0.1560 | 0.1276 | 0.1650 | −0.1363 |
| −0.1751 | −0.0039 | −0.0593 | 0.0602 | 0.0362 | −0.1723 | 0.0693 |
| −0.0236 | 0.1443 | −0.1502 | 0.0543 | 0.1259 | 0.0202 | −0.0445 |
| 0.0420 | 0.1565 | −0.0063 | 0.0855 | −0.1441 | 0.1046 | 0.1036 |
| −0.0805 | −0.1871 | 0.0375 | 0.0938 | 0.1462 | 0.0330 | 0.1403 |
| −0.0841 | −0.0865 | 0.0325 | −0.1915 | 0.0795 | −0.1255 | 0.1851 |
| −0.1689 | −0.1840 | 0.0732 | −0.2028 | 0.0170 | 0.0181 | −0.2342 |
| 0.0981 | 0.0246 | −0.1878 | −0.1935 | −0.2195 | −0.1745 | 0.2297 |
| −0.0976 | 0.1063 | −0.1310 | −0.1609 | −0.1503 | −0.0396 | −0.1040 |
| 0.2043 | 0.0374 | 0.0680 | 0.1182 | −0.0528 | 0.1904 | 0.0487 |
| −0.1855 | −0.1864 | −0.1240 | −0.0365 | 0.1475 | −0.0594 | −0.1358 |
| 0.0552 | 0.0802 | 0.0072 | 0.1511 | −0.1138 | −0.0829 | 0.1787 |
| −0.2018 | 0.0722 | 0.1055 | −0.0715 | −0.0116 | −0.1229 | 0.1131 |
| 0.1461 | −0.0653 | −0.1448 | 0.0348 | −0.0440 | 0.0522 | 0.0692 |
| 0.0276 | −0.2240 | −0.1107 | 0.0475 | 0.1777 | −0.0979 | 0.0389 |
| −0.0291 | −0.0735 | 0.0815 | −0.0905 | −0.0918 | 0.1564 | −0.0398 |
| 0.1149 | −0.0744 | 0.0080 | 0.1720 | −0.0784 | −0.1704 | 0.0048 |
| 0.0256 | 0.1939 | 0.1185 | −0.0360 | 0.0969 | 0.0185 | 0.0541 |
| −0.1209 | −0.0401 | −0.1085 | −0.1493 | 0.2022 | 0.1810 | −0.2025 |
| −0.0870 | 0.0466 | −0.0525 | 0.1803 | −0.0790 | 0.0786 | 0.0603 |
| 0.2035 | 0.1847 | −0.1434 | 0.1012 | 0.0249 | 0.1391 | −0.1038 |
| 0.0587 | 0.1706 | −0.1037 | −0.1067 | −0.1147 | 0.1792 | −0.1084 |
| −0.0379 | 0.0514 | −0.1542 | 0.0001 | 0.0923 | −0.1863 | 0.1070 |
| 0.0895 | 0.0258 | 0.0892 | −0.1791 | 0.1140 | −0.0848 | 0.1233 |
| 0.1344 | −0.1617 | −0.1451 | −0.1280 | 0.1280 | 0.0885 | −0.2216 |
| 0.1954 | 0.1661 | −0.0599 | 0.0210 | −0.1129 | −0.0155 | 0.0856 |
| −0.0081 | 0.0448 | 0.1396 | −0.0116 | 0.0479 | 0.0782 | −0.1142 |
| −0.1152 | −0.1823 | −0.1747 | 0.0500 | 0.0406 | 0.1218 | 0.1815 |
| 0.1533 | −0.1227 | 0.0033 | −0.0088 | −0.2110 | −0.1825 | −0.1559 |
| 0.1346 | −0.0885 | 0.1847 | 0.1589 | −0.1215 | 0.1386 | 0.0976 |
| 0.0545 | −0.0985 | −0.0830 | −0.0276 | −0.1225 | 0.1726 | −0.0255 |
| −0.0201 | 0.0482 | −0.0302 | −0.1679 | 0.0856 | 0.0231 | −0.0502 |
| −0.2117 | −0.0630 | −0.1635 | 0.0963 | −0.1471 | −0.0635 | −0.1792 |
| −0.1205 | −0.1977 | −0.1612 | −0.0475 | −0.0826 | 0.0595 | −0.1119 |
| 0.1025 | 0.0493 | −0.1749 | −0.0554 | −0.1992 | 0.0432 | −0.1617 |
| 0.0003 | −0.2067 | −0.0815 | 0.0239 | −0.0573 | −0.0292 | −0.0211 |
| 0.1185 | −0.1522 | 0.0271 | −0.1341 | 0.1224 | −0.0373 | 0.1868 |
| 0.1723 | −0.1436 | −0.0161 | 0.1408 | 0.1930 | −0.1730 | −0.1506 |
| −0.0841 | −0.0581 | −0.1197 | −0.0556 | 0.1410 | 0.0157 | −0.0916 |
| 0.0922 | 0.1557 | 0.1459 | 0.0347 | 0.0211 | −0.1832 | 0.1204 |
| 0.0129 | −0.0922 | −0.1120 | 0.1248 | 0.1169 | −0.1186 | −0.0569 |
| −0.1377 | −0.0457 | 0.1321 | −0.1221 | 0.0420 | −0.1806 | 0.1842 |
| −0.1891 | 0.1053 | 0.0608 | −0.0229 | 0.1524 | 0.1764 | 0.1412 |
| −0.1272 | −0.1600 | 0.0023 | 0.0734 | −0.1813 | 0.0180 | 0.0491 |
| −0.1567 | 0.1806 | 0.1365 | 0.1773 | −0.0209 | 0.1603 | 0.0586 |
| −0.1291 | 0.0701 | 0.0345 | −0.1747 | −0.1115 | 0.0143 | 0.1254 |
| 0.0596 | −0.1416 | 0.1789 | −0.1310 | −0.0654 | −0.0455 | 0.0133 |
| 0.0794 | 0.0220 | 0.0545 | −0.0560 | −0.1071 | 0.1274 | −0.1589 |
| 0.0589 | −0.0177 | −0.1684 | 0.0016 | −0.0498 | 0.1558 | 0.0112 |

TABLE 4-continued

Tube Universal Leak Detection System Weight W2 Matrix

| | | | | | | | | | |
|---|---|---|---|---|---|---|---|---|---|
| 0.1828 | 0.1851 | 0.1820 | −0.2024 | 0.0326 | 0.1823 | 0.0621 | | | |
| −0.0206 | 0.0621 | −0.0767 | −0.2037 | 0.0471 | −0.1237 | 0.1416 | | | |
| 0.1274 | −0.1289 | 0.1493 | −0.2024 | −0.1794 | 0.1712 | 0.1622 | | | |
| 0.0217 | 0.1168 | 0.0818 | 0.1873 | −0.0464 | 0.1054 | −0.1196 | | | |
| −0.0819 | −0.0198 | −0.1253 | 0.0215 | −0.1765 | −0.0312 | −0.1623 | | | |
| −0.0562 | 0.0723 | −0.1289 | 0.1578 | −0.0472 | 0.0443 | 0.0789 | | | |
| 0.1851 | −0.0916 | 0.1273 | −0.0624 | −0.1304 | 0.0082 | 0.1423 | | | |
| −0.0210 | −0.1409 | −0.1069 | −0.0866 | 0.1241 | −0.1653 | 0.0954 | | | |
| −0.1918 | 0.0656 | 0.1694 | −0.0259 | 0.1013 | −0.0922 | −0.1518 | | | |
| −0.1902 | −0.0580 | 0.1238 | 0.0044 | −0.1028 | 0.0306 | 0.1199 | | | |
| −0.1135 | −0.1772 | 0.1802 | −0.0632 | 0.0611 | −0.1816 | −0.0705 | | | |
| 0.1752 | −0.1555 | −0.1427 | 0.0054 | 0.1931 | −0.1598 | −0.1749 | | | |
| −0.0439 | −0.0538 | 0.0318 | 0.0718 | 0.1082 | 0.1323 | −0.0502 | | | |
| 0.0083 | −0.0877 | −0.1700 | 0.1609 | −0.0907 | −0.1661 | −0.1016 | | | |
| 0.1517 | 0.0428 | −0.0182 | 0.1143 | 0.1947 | −0.0936 | 0.1457 | | | |
| −0.0081 | −0.0652 | 0.0792 | 0.0039 | 0.0692 | −0.1529 | −0.0917 | | | |
| 0.0657 | 0.1612 | 0.1575 | 0.1464 | −0.0996 | 0.1779 | −0.0345 | | | |
| −0.1688 | 0.1163 | 0.0640 | −0.0157 | 0.1987 | −0.0563 | −0.0832 | | | |
| 0.1566 | 0.0905 | −0.0124 | −0.0911 | 0.0994 | 0.0825 | −0.0810 | | | |
| 0.0724 | 0.2001 | 0.1737 | −0.1849 | −0.0060 | −0.1523 | −0.1090 | | | |
| 0.1375 | 0.0061 | −0.0786 | 0.1978 | 0.0704 | −0.0129 | −0.1424 | | | |
| −0.1607 | 0.1591 | 0.1309 | 0.1480 | 0.0999 | 0.0438 | 0.1884 | | | |
| −0.0660 | 0.1053 | 0.0182 | −0.1339 | 0.1168 | 0.0861 | −0.0038 | | | |
| −0.1265 | 0.0822 | −0.1164 | 0.1430 | 0.1837 | −0.1324 | 0.1622 | | | |
| −0.1086 | −0.1788 | −0.1344 | 0.0045 | −0.1839 | −0.0327 | 0.1944 | −0.1103 | 0.1657 | −0.0477 |
| −0.1037 | 0.0770 | 0.0808 | 0.0057 | −0.1916 | 0.0903 | 0.0294 | −0.1813 | 0.0440 | 0.0673 |
| −0.2375 | 0.1845 | 0.1964 | 0.1569 | −0.1933 | 0.1456 | 0.2119 | 0.1723 | −0.0993 | 0.1792 |
| 0.1805 | −0.1861 | −0.0035 | 0.0796 | 0.0307 | −0.1924 | −0.0219 | 0.1789 | 0.1010 | 0.1826 |
| −0.0442 | 0.0763 | 0.0191 | −0.1952 | 0.1524 | 0.0942 | 0.2080 | 0.1789 | 0.0436 | 0.0001 |
| −0.0013 | −0.0201 | −0.0121 | 0.0408 | 0.1154 | 0.0765 | −0.1875 | −0.1062 | 0.0771 | −0.1768 |
| −0.1274 | −0.0247 | 0.0345 | −0.1175 | 0.0511 | 0.1165 | 0.0028 | −0.0611 | −0.0355 | −0.0295 |
| 0.0818 | −0.1670 | −0.1336 | −0.0003 | 0.1071 | −0.1695 | 0.2059 | −0.0811 | 0.0364 | 0.1256 |
| −0.0259 | 0.0860 | −0.1484 | 0.1955 | −0.1766 | −0.1578 | 0.0406 | −0.0111 | −0.1744 | 0.1384 |
| 0.2334 | −0.1805 | 0.1340 | 0.1251 | −0.0845 | 0.0210 | 0.1689 | 0.0759 | 0.1521 | −0.0831 |
| 0.0816 | −0.0637 | 0.0961 | −0.0567 | −0.1975 | 0.0731 | −0.1487 | −0.0211 | 0.1704 | 0.0994 |
| 0.0648 | 0.0861 | −0.1515 | −0.0252 | −0.0581 | 0.1628 | 0.1709 | 0.1075 | −0.0661 | −0.0584 |
| −0.1650 | −0.0660 | 0.1852 | −0.1762 | 0.0361 | 0.1796 | −0.1916 | 0.1560 | 0.0367 | −0.0528 |
| −0.0254 | 0.1581 | −0.0263 | 0.1743 | 0.0171 | −0.1182 | 0.0768 | −0.0623 | 0.1661 | 0.0852 |
| 0.1346 | 0.0998 | −0.0005 | −0.0130 | 0.0397 | 0.1549 | 0.1150 | −0.1167 | −0.1453 | −0.1609 |
| −0.1245 | 0.0824 | 0.0403 | 0.1285 | −0.1465 | 0.1910 | 0.1468 | −0.0390 | −0.0369 | 0.1561 |
| −0.0579 | −0.1816 | 0.0079 | −0.0485 | −0.0651 | −0.0146 | −0.0487 | −0.1712 | 0.1360 | 0.1807 |
| 0.1588 | −0.0006 | −0.1992 | 0.0195 | −0.1760 | 0.0410 | 0.0823 | −0.1678 | −0.1126 | −0.1595 |
| −0.0424 | −0.0392 | −0.0280 | 0.2234 | 0.1263 | 0.1079 | 0.0244 | −0.1185 | 0.1310 | −0.1313 |
| −0.1180 | −0.1625 | 0.1580 | 0.0207 | −0.0402 | −0.1761 | 0.0075 | −0.1427 | 0.1637 | 0.0940 |
| −0.1152 | 0.1368 | −0.2040 | −0.0220 | −0.1628 | 0.0081 | 0.0833 | −0.1096 | 0.0777 | 0.0392 |
| 0.2297 | 0.0518 | −0.1907 | 0.1610 | 0.0464 | −0.1397 | 0.0995 | −0.0207 | 0.0363 | −0.1095 |
| 0.1070 | −0.0596 | 0.1297 | −0.1587 | 0.0379 | −0.0389 | −0.0591 | 0.1764 | −0.1232 | −0.0003 |
| 0.0469 | −0.0557 | −0.1023 | 0.0922 | −0.1084 | −0.0826 | −0.0785 | 0.1489 | 0.1754 | −0.0628 |
| −0.0048 | −0.1488 | −0.0232 | −0.0027 | −0.1915 | −0.1308 | 0.1180 | −0.0712 | −0.1716 | 0.1256 |
| 0.1255 | −0.1634 | −0.1678 | 0.1470 | 0.1552 | 0.0937 | −0.1024 | 0.0389 | −0.1066 | 0.0481 |
| 0.1905 | 0.1352 | −0.1915 | 0.1182 | −0.0551 | −0.1976 | −0.0637 | 0.0316 | 0.1230 | 0.0138 |
| 0.0530 | −0.0158 | −0.0559 | 0.0474 | −0.0524 | 0.1226 | 0.1329 | 0.0558 | 0.1673 | 0.1132 |
| 0.0343 | −0.0487 | 0.1755 | −0.1950 | −0.0207 | 0.1685 | −0.0581 | 0.1379 | 0.0771 | 0.0743 |
| −0.1601 | −0.1456 | 0.0579 | 0.1570 | 0.1210 | 0.0074 | −0.1279 | −0.1511 | −0.1509 | −0.1640 |
| −0.0533 | −0.1859 | −0.1240 | 0.0624 | −0.1856 | −0.1878 | −0.0632 | 0.0473 | 0.0168 | 0.1460 |
| −0.0043 | 0.0443 | −0.1710 | 0.0542 | 0.0222 | 0.0550 | −0.0106 | −0.1163 | 0.0221 | −0.1636 |
| −0.2199 | 0.0806 | −0.1386 | 0.0068 | 0.1188 | −0.1033 | 0.1807 | 0.1772 | 0.1686 | −0.1032 |
| −0.0171 | 0.1407 | −0.0189 | −0.1568 | 0.0917 | 0.0649 | 0.0894 | 0.0423 | 0.0440 | 0.1741 |
| 0.1676 | −0.1578 | 0.0060 | 0.1379 | 0.0536 | −0.0461 | 0.0486 | 0.1231 | 0.1647 | −0.1207 |
| 0.0659 | −0.1292 | 0.0930 | 0.1197 | −0.1299 | 0.1541 | −0.0726 | −0.1206 | −0.0084 | 0.1790 |
| 0.0529 | 0.1027 | −0.1761 | 0.1499 | 0.1384 | 0.0713 | 0.0234 | 0.1460 | 0.0772 | 0.1033 |
| −0.0678 | −0.1148 | 0.0128 | 0.0688 | −0.1113 | −0.0149 | −0.0549 | 0.1460 | 0.1697 | 0.0531 |
| 0.1058 | 0.0748 | 0.0082 | 0.2197 | 0.0596 | −0.0919 | 0.2260 | −0.0124 | 0.1763 | 0.1825 |
| 0.0473 | 0.1479 | 0.0732 | 0.0032 | 0.1452 | −0.1110 | −0.0373 | 0.1456 | −0.1043 | −0.0833 |

TABLE 5

Tube Universal Leak Detection System Weight W3 Vector

−0.9877
0.54
−0.9356
−0.353
0.6271
0.8469

TABLE 5-continued

Tube Universal Leak Detection System Weight W3 Vector

−0.9765
−0.0795
−0.6412
0.9032
0.7329
−0.336
0.0923
−0.3751
−0.4593
0.6697
0.8555
−0.1294
−0.2055
−0.2035
−0.0055
−0.0649
−0.1163

TABLE 6

Tube Universal Leak Detection System Biases

| b1 | b2 | b3 |
|---|---|---|
| −0.9647 | −0.5533 | −0.6762 |
| 0.822 | 0.3251 | |
| −0.8476 | 0.5472 | |
| 0.407 | 0.3461 | |
| 0.5322 | −0.4323 | |
| −1.9469 | 0.2148 | |
| 1.6961 | 0.3997 | |
| 0.9917 | 0.1978 | |
| 0.3949 | 0.7243 | |
| −2.3931 | −0.248 | |
| −0.9871 | −0.5398 | |
| 1.5815 | −0.0803 | |
| −3.846 | 0.2239 | |
| −0.3644 | −0.1711 | |
| 3.1565 | −0.3525 | |
| 2.2384 | −0.1407 | |
| −2.4713 | −0.237 | |
| 1.4708 | 0.5548 | |
| 0.467 | 0.2226 | |
| −0.3862 | 0.7471 | |
| −2.5361 | 0.1897 | |

TABLE 6-continued

Tube Universal Leak Detection System Biases

| b1 | b2 | b3 |
|---|---|---|
| 1.0673 | 0.5709 | |
| 1.9486 | −0.2815 | |
| −2.4204 | −0.7172 | |
| −1.2028 | | |
| 0.013 | | |
| 1.4461 | | |
| 3.3807 | | |
| −2.8041 | | |
| −3.8789 | | |
| −3.2556 | | |
| 0.9405 | | |
| 0.8649 | | |
| 1.2816 | | |
| −3.2461 | | |
| −1.3507 | | |
| 1.2918 | | |
| −1.1333 | | |
| 0.7896 | | |
| 0.9118 | | |

For determination of the location of tube leaks in one of many boilers which are operated by the Tennessee Valley Authority (TVA) as, for example, Kingston 9 Boiler, leaks in eleven different locations can be detected by this using the LLDSs, LLDS 1 through LLDS 11, shown in FIG. 2, supra. These different locations are:

| | |
|---|---|
| Location 1: | Superheater Front Radiant Platen (SHFRP) |
| Location 2: | Reheater Front Radiant Platen (RHFRP) |
| Location 3: | Superheater Waterwall (SHWW) |
| Location 4: | Superheater Intermediate and Pendants (SHIP) |
| Location 5: | Superheater Outlet Pendants (SHOP) |
| Location 6: | Reheater Intermediate and Pendants (RHIP) |
| Location 7: | Reheater Outlet Pendants( RHOP) |
| Location 8: | Reheater Waterwall (RHWW) |
| Location 9: | Primary Superheater (PSH) |
| Location 10: | Superheater Economizer (SHEC) |
| Location 11: | Reheater Economizer (RHEC) |

The local sensitive variables for each location are given in Table 7, infra.

TABLE 7

Arrangement of Local Leak Sensitive Variables

| LLSV 1 | LLSV 2 | LLSV 3 | LLSV 4 | LLSV 5 | LLSV 6 | LLSV 7 | LLSV 8 | LLSV 9 | LLSV 10 | LLSV 11 |
|---|---|---|---|---|---|---|---|---|---|---|
| WFH5TOT | LFNTLTR (1) | LCLW | ncfdcs (1) | WFH5TOT | WFH5TOT | WFH5TOT | TBPSI (13) | TBPSX (20) | LFNTLTS (1) | PBPGX (7) |
| PDA | PFNGRM | PWBS | PFNGSM | PFNGRM | PIPIV | PIPIV | PHPFSFOX (1) | PFNGRM | PFNGSM | FGSDAI |
| ncfdcs (1) | PWBS | WDIWS | PBPGX (11) | PWBS | LFNTLTR (1) | LFNTLTR (1) | PBD | TBPSX (20) | PBPGX (14) | TMSDCS |

Referring again and back to FIG. 2, each of the LLDSs shown generally at 213, outputs its decision about the presence of a leak to inference block 214. The final determination of the location of the tube leak is made at inference block 214. The decision in block 214 is made as follows. Each of the eleven LLDS blocks use the corresponding LLSV input and estimates the leak as if it were present at that location. The output of each LLDS is sent to inference block 214, wherein is made such final determination by choosing the location whose LLDS has the largest leak signal. To illustrate in greater detail just how this works, the reader's attention is directed to Example I, discussed infra in the Examples section.

In the first embodiment of the instant invention, eleven likely boiler locations can be detected by the instant, new and novel ANN based leak detection system. The number of process sensitive variables required by the system is twenty-three (three ULSVs and twenty LLSVs). The list of these variables is shown in Table 8, below.

TABLE 8

List of Local Leak Sensitive Variables required by the First ANN Based Tube Leak Detection System

| VARIABLES | MEANING |
|---|---|
| FGSDAI | LEAK-OFF HDR FLOW |
| LCLW | COLDWELL TANK LEVEL |
| LFNTLTR (1) | RH BR TILT CNR #1 POSITION |
| LFNTLTS (1) | SH BR TILT CNR #1 POSITION |
| ncfdcs (1) | Pulv A Feeder Flow |
| PBD | BOILER DRUM PRESS - NORTH |
| PBPGX (11) | SH FURNACE PRESS AFTER HT SUPHT |
| PBPGX (14) | SH FURNACE PRESS AFTER ECONOMIZER |
| PBPGX (7) | RH FURNACE PRESS AFTER ECONOMIZER |
| PDA | DEAERATOR PRESSURE |
| PFNGRM | RH FURNACE DRAFT A |
| PFNGSM | SH FURNACE DRAFT A |
| PHPFSFOX (1) | TURB FIRST STAGE PRESS A |
| PIPIV | HOT REHEAT STEAM INT VLV A PRESS |
| PWBS | SH FURN WINDBOX PRESSURE |
| TBPSI (13) | RH ATTEMPT A BEFORE SPRAY STM TEMP |
| TBPSX (20) | RH OUTLET HEADER TEMPERATURE A |
| TMSDCS | SH SEC OUTLET HDR TEMPERATURE A |
| WDIWS | COLDWELL TANK MAKEUP FLOW |
| WFH5TOT | CONDENSATE FLOW TO DEAERATOR |

This design is quite suitable for a modern boiler, wherein a large number of process variables is monitored and wherein the instant embodiment one of the new leak detection system will not require additional instrumentation. For effecting early tube leak detection in older boilers, this may not be the case since not all the above variables are being monitored by the instrumentation. For this reason, another design, embodiment two of the instant invention, has been developed and is taught below which requires the input of a smaller number of process variables as such smaller number are being monitored by boilers of older designs.

Figure 4:
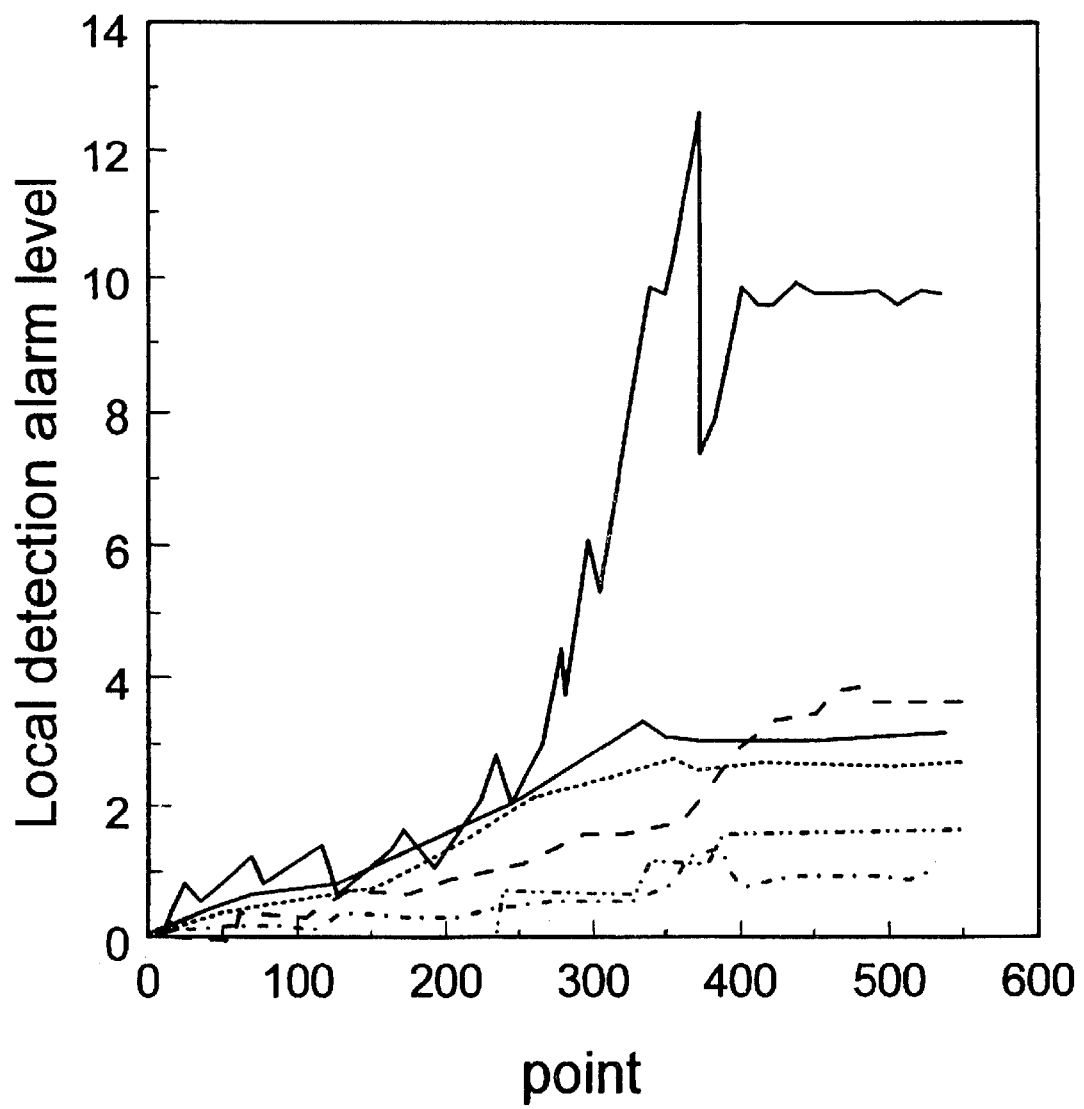
In FIG. 4 there is a graphical depiction of an actual example of the outputs of the instant LLDSs, i.e. LLDS 1 through LLDS 11, illustrated and discussed in FIG. 2, supra. It should be noted that in the particular example and leak situation herein depicted that the values for five of the LLDSs indicated an output leak level of about zero and are not discernible, whereas five of the other LLDSs had leak level outputs ranging between about one and four. The alarm level output of LLDS 4 is shown, after about 300 points, i.e., about 25 hours, to reach almost ten, and therefore was interpreted to be representative of the leak location. It will, of course, be appreciated by those skilled in this art that the particular graphical illustrations in FIG. 4 are, for the sake of simplicity, reproduction, and convenience, merely simulated by the draftsman and are not a literal representation, nor to be construed as such of the graphs plotted during the actual testing.
Figure 5:
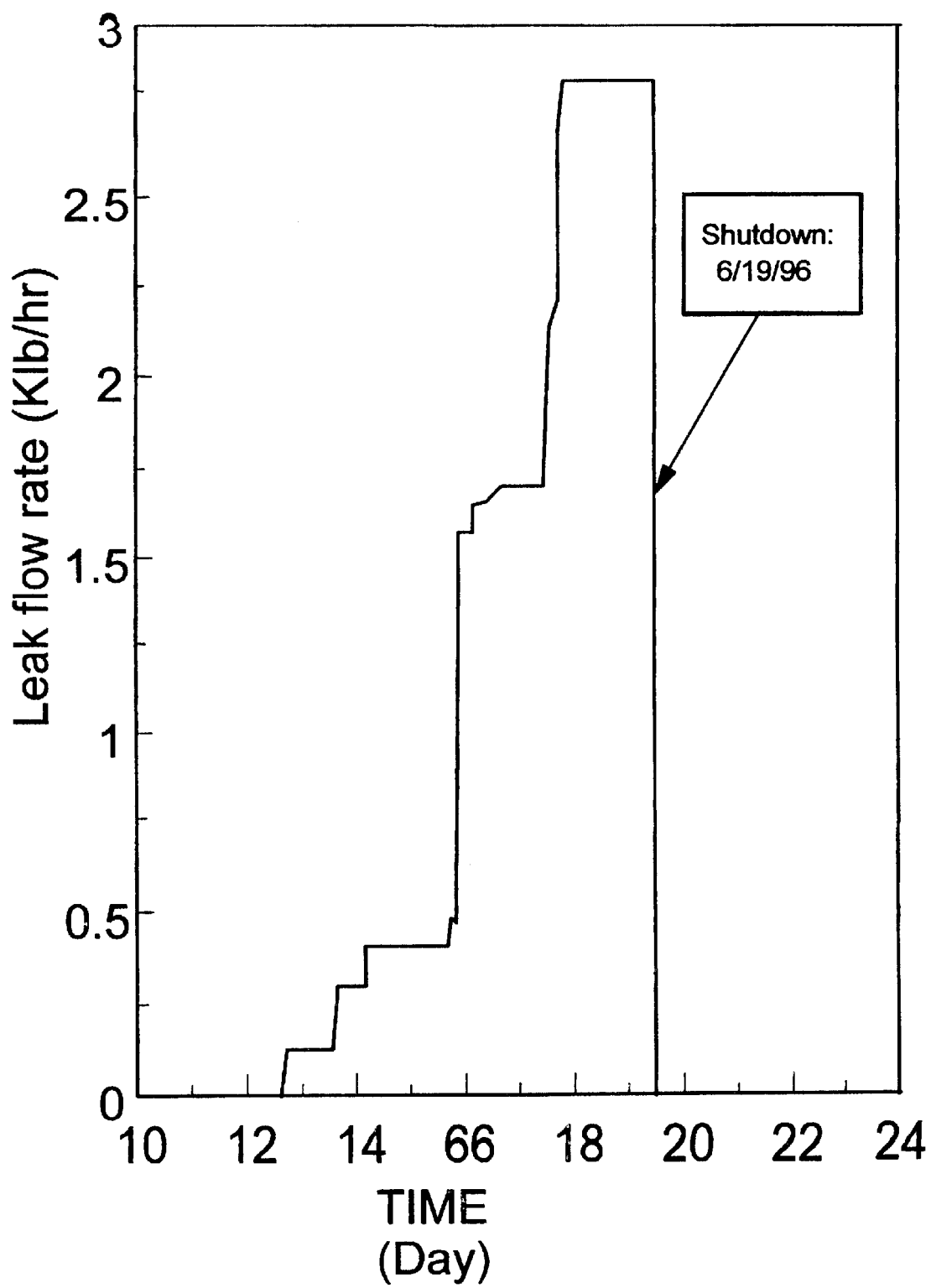
In FIG. 5 there is depicted still another graphical illustration of an actual leak detection activity wherein the boiler tube leak detection system of the instant invention actually predicted a tube leak event some six days prior to the outage event necessitated when such leak degraded and progressed to the stage wherein the boiler could no longer be operated. Again, as in the description of illustration of FIG. 4, supra, the graphical depiction is herein simulated for the sake of simplicity, reproduction, and convenience and is not a literal representation of the graphical data actually obtained.

Note: More specific reference to FIG. 4 and FIG. 5 is made below in conjunction with the discussions of Examples I and II, respectively.

Embodiment Two of the Instant ANN Based Boiler Tube Leak Detection System. Referring now more specifically to FIG. 6, it will be appreciated that in the practice of this second embodiment, the likely locations at which a tube leak may be, or is likely to occur has conveniently and expeditiously been divided into four groups (four subsystems of the boiler in this case): the economizer (EC), the watervall (WW), the superheater (SH), and the reheater (RH). In the practice of embodiment two, the presence of a leak in any one of these groups is monitored. In order to detect a leak event in a group of location, the concept of GLSVs is introduced. These are variables which exhibit significant changes whenever a leak event occurs in any one of the four systems (four groups).

The GLSVs, supra, are used as input to ANN based GLDS 612 comprised of GLDS 1 through GLDS 4, whose output to inference engine block 613 is an indication of the leak level. Similarly to the LLDS 1 through LLDS 11 in FIG. 2, supra all of these GLDSs comprising 617 work in parallel in order to detect, at the earliest possible moment, the presence of a tube leak. Again, just for example, an output therefrom at level zero indicates no leak is present in that group location, it being understood, of course, that, if desired, a level of one could be so utilized. The procedure of identification of the different variables uses the logic of flow shown in FIG. 1, supra, with a comparison made in comparison block 106 against a threshold value predetermined and specific to GLSVs. The arrangement of the GLSVs within each of the four groups for this second embodiment is given in the Table 9, below.

TABLE 9

Arrangement of Group Leak Sensitive Variables

| GLSV 1 | GLSV 2 | GLSV 3 | GLSV 4 |
|---|---|---|---|
| PDA | PBPGX (13) | PPRX (2) | PBPGX (13) |
| PBPGX (6) | CHWMUVO | CHWMUVO | CHWMUVO |
| PBPGX (13) | PFD (2) | PBPGX (7) | PFD (2) |
| WFH5TOT | XFNO2RFX (1) | PBPGX (11) | XFNO2RFX (1) |

Referring again more specifically to FIG. 6, it may be appreciated that the output of each of GLDS 1 through GLDS 4 is sent to inference engine block 613, wherein is made the determination of the group in which the leak has taken place. After this second determination, the third and next step is to determine where the leak event is located within that group. For this reason, the concept of SGLSVs is introduced. The number of subgroups depends on the availability of the instrumentation and is boiler dependent. The final determination of just where the leak event is located in a particular group utilizing subgroup leak detection procedure and is effected in subgroup leak location system, generally illustrated at 615.

More specifically, similar to the determination of the GLSVs in the procedure taught above in conjunction with FIGS. 1 and 6, there is also determined by employment of similar procedure, a set of SGLSVs, wherein still a different threshold value is utilized therefore in the operation of comparison block 106 than was the threshold value employed during determination of such GLSVs. In the most preferred arrangement, a relatively small number, usually an average of three, of said SGLSVs is associated with each of said four boiler subsystems. To determine which subgroup contains the leak the SGLSVs of each subgroup are input to ANNs previously trained for handling such input and wherefrom there is output to a subgroup inference engine contained in 615 wherein is determined the particular location of the leak event.

It will be appreciated that the detection of leak events, in an older design boiler by means of utilizing the four subsystems supra, requires only eleven process sensitive variables rather than the twenty-three required for more modern boilers treated in accordance with embodiment one, supra. These eleven variables are shown in Table 10, below.

TABLE 10

List of Group Leak Sensitive Variables Required
by the Second Embodiment of the Instant
ANN Based Tube Leak Detection System

| VARIABLE | MEANING |
| --- | --- |
| PDA | DEAERATOR PRESSURE |
| PBPGX (6) | RH FURNACE PRESSURE AFTER LT SHTR |
| PBPGX (13) | SH FURNACE PRESSURE AFTER LT SHT |
| WFH5TOT | CONDENSATE FLOW TO DEAERATOR |
| CHWMUVO | HOT WELL MAKEUP VALVE DEMAND |
| FFD (2) | COMBUSTION AIR FLOW A1 |
| XFNO2RFX (1) | RH FRNC OXYGEN ANALYZER PROBE A |
| PPRX (2) | ID FAN INLET SUCTION PRESSURE |
| PBPGX (7) | RH FURN PRESSURE AFTER ECONOMIZER |
| PCRHT | COLD REHEAT STEAM FROM TURB PRESSURE |
| PBPGX (11) | SH FURNACE PRESSURE AFTER HT SH |

Neuro-Fuzzy Based Boiler Tube Leak Detection System Comprising Embodiments Three and Four. Up to the present time, the ANN based leak detection system, described supra, has performed very well on Kingston 9 boiler. Additional testing of the tube leak detection system is under way using other TVA boilers. In order to further improve the likelihood of early detection of boiler tube leaks, another design philosophy is now proposed. Because the critical procedure in successful detection of boiler tube leak events is to learn the map between tube LSVs and leak level and location, the ANN based tube leak detection system of either embodiment one or embodiment two, supra relies solely on numerical data. An alternate and new design comprising embodiments three and four of the instant invention attempts to arrive at decisions more in the way that the human brain functions by combining ANNs with fuzzy logic. It uses numerical data as well as linguistic information provided by experienced human operators to learn such a map. The benefits of such still newer design for embodiments three and four are many. First it increases the robustness of the leak detection system in the presence of sensor inaccuracies and noisy environment. The new fuzzy logic system does not require accurate data. It operates on vague information and performs approximate reasoning. Second it can operate on incomplete information. In case of sensor failure, the system can still make decision about leaks. Accordingly, two neuro-fuzzy leak detection systems are under development. The first utilizes the same sensitive process variables information as the first embodiment which comprise an ANN based detection system operated in accordance with the procedures shown in FIG. 2 supra, except that herein the ANN based detectors are replaced by inference engines.

Referring now more specifically to FIG. 7, such system is shown and in particular such inference engines, comprised of ULDIE shown at 711 and LDIE 1 through LDIE 11, shown generally at 713. To make inference, each of the LDIE, LDIE 1 through LDIE 11, use a knowledge base. Said knowledge base comprises the fuzzy map between a leak in a given location and the set of appropriate sensitive variables. This fuzzy map is modeled by a set of "If Then" rules. An example of such a rule is:

R1: IF the change in Combustion Air is POSITIVE LARGE and the change in ID Fan Inlet Suction pressure is NEGATIVE LARGE THEN the leak is LARGE.

Note that the above rule involves linguistic statements, called fuzzy sets, such as "Large." Each one of these fuzzy sets will have a certain membership function. In this instant still newer designed system all of the membership functions are of triangular shape. They are characterized by their center (c) and spread (s). The key issue here is how to determine the center and spread of the membership function of each fuzzy set involved in the different rules without the need of an expert person. To accomplish this, each LSV is represented by a fuzzy set. The universe of discourse of each LSV, $v_i$, is divided into $n_i$ partitions. The maximum number of rules N is equal to $$N = \prod_{i=1}^{m} n_i$$

where m is the number of sensitive variables used as input to a particular detection subsystem. Each one of these rules has the form of rule R1 taught supra. To determine the parameters of the fuzzy sets involved in each rule, fuzzy artificial neural networks (FANN) and boiler leak data are used. The FANNs are required in order that the parameters of the knowledge base used by the different inference engines may be learned. The set of fuzzy rules for a given leak at a given location constitutes a knowledge base of an appropriate inference engine. Such knowledge base contains the fuzzy map between the leak and its location and the set of corresponding process sensitive variables.

Referring now more specifically to FIGS. 7 and 8, two neuro-fuzzy design strategies may be utilized in the practice of the instant invention. The first, illustrated in FIG. 7 and comprising embodiment three, uses the same process sensitive variables and processing architecture as used in the first ANN based tube leak detection system taught in embodiment one, supra. A universal leak detection block or universal leak detection inference engine (ULDIE) at 711, uses the ULSVs as input and produces a fuzzy output in the form of zero, small, medium, or large. Once a leak is confirmed, i.e. when (for this example) the output is either medium or large, all inference engines comprising LDIE 1 through LDIE 11 and referenced generally at 713 begin, simultaneously and in parallel, to estimate the location of the leak. Their output is sent in parallel to inference block 714 for final determination as taught supra.

More specifically, it will be appreciated by those skilled in this art that in this arrangement there is utilized a tube ULDIE for determining the likelihood of an occurrence of a tube leak event as, for example, in an industrial boiler. The ULDIE is operatively associated with inputs of observed changes of ULSVs, and comprises a first leak inference engine. The first inference engine is provided with both a knowledge base comprising a set of fuzzy rules describing the fuzzy map between each of said ULSVs and the relative magnitude of said leak event, and a database defining the membership functions utilized in said fuzzy rules. It is also provided with a reasoning mechanism arranged for performing inference procedures upon said set of fuzzy rules. The arrangement is also provided with a plurality of LLDS, each of which is operatively associated with inputs of one of a plurality of observed changes in said industrial boiler of LLSVs each of said LLDSs comprising a corresponding second leak inference engine. Each such second leak inference engine, in turn, is provided with both a knowledge base comprising a set of fuzzy rules describing the fuzzy map between the corresponding LLSV and the location of said leak event, as well as a database defining the membership functions utilized in said fuzzy rules. It is also provided with a reasoning mechanism arranged for performing inference procedures upon said fuzzy rules. The arrangement is also provided with a third inference engine for receiving an output from each of said plurality of LLDSs and for determining the location in the boiler of said leak event. The third inference engine is also provided with a knowledge base comprising a set of fuzzy rules describing the fuzzy map between each of said LLDS and the location of said leak event, a database defining the membership functions utilized in said fuzzy rules, and reasoning mechanism arranged for performing inference procedures upon said fuzzy rules, and of the output from each of said plurality of LLDSs.

Still more specifically, operation of this arrangement for tube leak detection, in its most preferred form, comprises determining for the boiler, a set of tube ULSVs and representing each of said ULSVs with a fuzzy set comprising linguistic statements. It also comprises building both a knowledge base for a respective first leak inference engine which contains a set of fuzzy rules describing the fuzzy map between each of its corresponding ULSVs and the relative magnitude of said leak event and a database for said corresponding first leak inference engine which defines the membership functions used in the fuzzy rules of said knowledge base. The respective first leak inference engine further comprises reasoning mechanism for performing inference procedures upon said set of fuzzy rules for decision-making on the magnitude of said leak event. In addition, there is determined for said boiler a set of tube LLSVs. Each of said LLSVs is represented with a fuzzy set comprising linguistic statements. A knowledge base is built for each of a set of second leak inference engines, each said second leak inference engine corresponding to one of said LLSVs, and each such knowledge base comprising a set of fuzzy rules describing the fuzzy map between that LLSV corresponding to that second leak inference engine and the location of said leak event. For each of said second leak inference engines for which a knowledge base is built, there is built a database which defines the membership functions used in the fuzzy rules with the knowledge base corresponding to said second leak inference engine. Said second leak inference engines further comprises a reasoning mechanism for performing inference procedures upon its corresponding set of fuzzy rules for decision-making on the location of said leak event. Thereafter said industrial boiler is monitored for the occurrence of a leak event by observing changes in values in said boiler for each of said ULSVs and supplying said observed changes in values to said first inference engine for generating a fuzzy output therefrom. The resulting fuzzy output is compared to a ranking of the linguistic statements. If the linguistic statements are greater than a predetermined rank, it is concluded that a leak event is occurring. Thereafter changes in values from said boiler for each of said LLSVs is observed and supplied to the LLSVs corresponding second inference engine for simultaneously producing therefrom a fuzzy output. Each fuzzy output is simultaneously introduced to a third leak inference engine. The third leak inference engine is provided with a knowledge base comprising a set of fuzzy rules describing the fuzzy map between the location of said leak event and each LLSV, a database defining membership functions used in the fuzzy rules of the third leak inference engine knowledge base, and reasoning mechanism for performing inference procedures upon each of said fuzzy rules for determining the location, in said boiler, of said leak event.

Referring now more specifically to FIG. 8, in such design comprising embodiment four of the instant invention, all GLIEs, comprising GLIE 1 through GLIE 4 and shown generally at 812, use their appropriate GLSVs, i.e. GLSV 1 through GLSV 4, respectively, as input and their knowledge base to estimate a leak, if any. Their output is sent to group inference block 813 for final determination of the likelihood of the occurrence of a leak event and the particular group which is "leaky." Subsequently, only that inference engine representing that particular group identified as leaky is inputted with subgroup fuzzy variables for purposes of leak location identification in block 815. Further procedures are as previously discussed in the teaching relating to embodiment two including the depiction in FIG. 1.

Referring now more specifically to FIG. 9, the architecture shown generally in FIG. 8 is depicted for the arrangement herein shown in greater detail. Although this architecture is somewhat similar to that shown in FIG. 6, supra, inference engines are used instead of ANNs for both the four groups and for the six subgroups with a separate inference engine utilizing the outputs of the four groups and another separate inference engine utilizing the outputs of the six subgroups, i.e., a second GLIE and a second SGLIE, respectively. From the depiction, it will be appreciated by those skilled in this art that therein are utilized a plurality of first tube GLDSs for determining the likelihood of the occurrence of a boiler tube leak event wherein each of these GLDS is operatively associated with inputs of observed changes in said industrial boiler of at least one corresponding GLSV and comprises a corresponding first GLIE. Each first GLIE is provided with a knowledge base comprising a set of fuzzy rules describing the fuzzy map between said at least one corresponding GLSV and the relative magnitude and group location of said leak event, a database defining the membership functions utilized in said fuzzy rules, and a reasoning mechanism arranged for performing inference procedures upon said set of fuzzy rules. A second GLIE receives an output from each of said plurality of GLDSs and determines the likelihood of a leak event and the corresponding GLDS in which such boiler leak event can be found. This second GLIE is provided with a knowledge base comprising a set of fuzzy rules describing the fuzzy map between each such output from each said GLDSs and the location of said leak event, a database defining the membership functions utilized in said fuzzy rules, and a reasoning mechanism arranged for performing inference procedures upon said fuzzy rules, and of said outputs from each of said plurality of GLDSs. A plurality of first tube SGLDSs is provided for determining, wherein the respective GLDS can be found, the leak event. The SGLDSs arc operatively associated with inputs of observed changes in said industrial boiler of at least one SGLSV, and each comprises a corresponding first SGLIE. Each such first SGLIE is provided with a knowledge base comprising a set of fuzzy rules describing the fuzzy map between said corresponding SGLSVs and the location in the subgroup of said leak event, a database defining the membership functions utilized in said fuzzy rules, and a reasoning mechanism arranged for performing inference procedures upon said set of fuzzy rules. There is also provided a second SGLIE for receiving an output from each of said plurality of SGLDSs and for determining the location in the boiler of said leak event. This second SGLIE is provided with a knowledge base comprising a set of fuzzy rules describing the fuzzy map between each such output from each of said plurality of SGLDSs and the location of said leak event, a database defining the membership functions utilized in said fuzzy rules, and a reasoning mechanism arranged for performing inference procedures upon said fuzzy rules, and of said outputs of each of said plurality of SGLDSs.

Still more specifically, operation of this arrangement, in its most preferred form comprises determining for said boiler, a set of tube GLSVs and arranging same into a predetermined number of individual groups. Each resulting individual group of GLSVs is represented with a fuzzy set comprising linguistic statements. For each such individual group of GLSVs there is both a knowledge base for a corresponding first GLILE which contains a set of fuzzy rules describing the fuzzy map between each GLSV in that group and the relative magnitude of said leak event, and a database for the same corresponding first GLIE which defines the membership functions used in the fuzzy rules of the corresponding group knowledge base with each said corresponding first GLIE further comprising a reasoning mechanism, said reasoning mechanism disposed for performing inference procedures upon said fuzzy rules for decision-making on the magnitude of said leak event. There is also determined for said boiler, a set of tube SGLSVs which are arranged into a predetermined number of individual subgroups. In the most preferred embodiment, the number of said subgroups is at least equal to the number of individual groups of SGLSVs, whereby there is at least one individual subgroup of SGLSVs corresponding to each individual group of GLSVs and whereby each subgroup comprises at least one SGLSV. Each of the individual subgroups of SGLSVs is provided with a fuzzy set comprising linguistic statements, and for each thereof there is built both a knowledge base for its corresponding first SGLIE which contains a set of fuzzy rules describing the fuzzy map between each SGLSV in that subgroup and the location of said leak event, and a database for the same corresponding SGLIE which defines the membership functions used in the fuzzy rules of the corresponding subgroup knowledge base. Further, each such corresponding SGLIE is provided with a reasoning mechanism for performing inference procedures upon said fuzzy rules for decision-making on the location of said leak event. Operation of the arrangement includes monitoring said industrial boiler for the occurrence of a leak event by observing changes in values in said boiler for each of said GLSVs in each group, and supplying said observed changes in values to each first GLIE for generating a fuzzy output from each thereof. Each of these resulting fuzzy outputs is introduced to a second GLIE, said second GLIE being provided with both a knowledge base comprising a set of fuzzy rules describing the fuzzy map between the magnitude of said leak event and each GLSV and a database defining membership functions used in the fuzzy rules of said knowledge base, together with a reasoning mechanism for performing inference procedures upon said fuzzy rules. The resulting fuzzy outputs from the second GLIE is compared to a ranking of the linguistic statements, whereby if any of the linguistic statements is greater than a predetermined rank, concluding that a leak event is occurring and further determining in which of the individual group of the plurality of GLSV groups said leak event is located. Subsequently said industrial boiler is monitored for further determining the more specific location of said leak event by observing changes in values from said boiler for each of said SGLSVs, but only those in that particular group identified as containing the situs of said leak event and supplying said observed changes in values to each of the corresponding first SGLIE corresponding to each SGLSV in that group whereby each such resulting fuzzy output is introduced to a second SGLIE which is provided with both a knowledge base comprising a set of fuzzy rules describing the fuzzy map between the location of said leak event and each SGLSV in that group identified by the second GLIE, and a database defining membership functions used in the fuzzy rules in said knowledge base of said second SGLIE together with a reasoning mechanism for performing inference procedures upon each of said fuzzy rules for determining the location in the boiler of the leak event.

EXAMPLES

In order that those skilled in the art may better understand how the present invention can be practiced, the following examples are given by way of illustration only and not necessarily by way of limitation, since numerous variations thereof will occur and will undoubtedly be made by those skilled in the art without substantially departing from the true and intended scope of the instant invention herein taught and disclosed.

Example I

In this example, information and data were collected which correspond to a leak which took place in the Kingston 9 boiler of TVA, supra, in the Superheater Intermediate and Pendant (SHIP), a subsystem of the superheater, (Location 4).

Referring now more specifically to FIG. 4, the outputs of the eleven LLDSs corresponding to LLDS 1 through LLDS 11, of FIG. 2 supra, are illustrated. The x-axis represents time in terms of points (p). The actual time is equal to the number of points times five minutes; t=5p minutes. The y-axis represents the leak level as estimated by the different LLDSs in K1b/hr. As previously discussed, five LLDSs had zero or negligible outputs and five LLDSs had outputs between one and four. LLDS 4 was around ten. Therefore the SHIP was declared as the leak location. The outputs of the other LLDSs are treated as false alarms. The decision of the instant, new and novel ANN-based leak detection system was confirmed by later physical inspection of the boiler by TVA personnel.

Example II

Referring now more specifically to FIG. 5, therein is illustrated another example of a successful ANN based tube leak detection operation. In this case the tube leak took place in June 1996 at TVA Kingston 9 boiler. As a result of this leak, a shut down took place in June 19. As can be seen in FIG. 5, the instant ANN based tube leak detection system detected the beginning of the leak event on June 12. This constitutes about a seven day early warning period.

INVENTION PARAMETERS

After sifting and winnowing through the data, supra, as well as other results and operations of the instant, new, novel, and improved technique, including methods and means for the effecting thereof, the operating variables, including the acceptable and preferred conditions for carrying out this invention are summarized below.

| Variables | Operating Limits | Preferred Limits | Most Preferred Limits |
| --- | --- | --- | --- |
| ULSV | 2–6 | 3–5 | 4 |
| LLSV | 10–20 | 12–18 | 15 |
| GLSV | 6–16 | 8–12 | 10 |

The information contained in the table, supra, indicates the number of sensitive variables needed (desired) by the ANN based detection system. The same number of variables will be applicable for the fuzzy logic based detection system.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. A process for determining a boiler tube leak event in industrial boilers said process comprising:
   (a) determining for a boiler, a set of tube universal leak sensitive variables ULSVs;
   (b) representing each of said ULSVs with a fuzzy set comprising linguistic statements;
   (c) building a knowledge base for a first inference engine which contains a set of fuzzy rules describing a fuzzy map between each of said ULSVs and a relative magnitude of said leak event;
   (d) building a database for said first inference engine which defines membership functions used in the fuzzy rules of said knowledge base, and said first inference engine further comprising a reasoning mechanism for performing inference procedures upon said set of fuzzy rules for decision-making on the magnitude of said leak event;
   (e) determining for said boiler a set of tube local leak sensitive variables LLSV's;
   (f) representing each of said LLSVs with a fuzzy set comprising linguistic statements;
   (g) building a knowledge base for each of a set of second inference engines, each of said second interference engines in said set corresponding to one LLSV, and each such knowledge base comprising a set of fuzzy rules describing a fuzzy map between the LLSV corresponding to that second inference engine and the location of said leak event;
   (h) for each of said second inference engines for which a knowledge base is built in step (g), supra, building a database which defines membership functions used in the fuzzy rules with the knowledge base corresponding to said second inference engine and said second inference engines further comprising a reasoning mechanism for performing inference procedures upon its corresponding set of fuzzy rules for decision-making on the location of said leak event;
   (i) thereafter monitoring said boiler for occurrence of a leak event by observing changes in values in said boiler for each of said ULSVs and supplying said observed changes in values to said first inference engine for generating a fuzzy output therefrom;
   (j) comparing the fuzzy output in step (i), supra, to a ranking of the linguistic statements represented in step (b), supra;
   (k) if the linguistic statement compared in step (j), supra, is greater than a predetermined rank, concluding that a leak event is occurring and thereafter observing changes in values from said boiler for each of said LLSVs and supplying said observed changes in values to said LLSV's corresponding second inference engine for simultaneously producing therefrom a fuzzy output; and
   (l) simultaneously introducing each fuzzy output produced in step (k), supra, to a third inference engine, said third inference engine being provided with a knowledge base comprising a set of fuzzy rules describing a fuzzy map between location of said leak event and each LLSV, a database defining membership functions used in the fuzzy rules of the third inference engine knowledge base, and a reasoning mechanism for performing inference procedures upon each of said fuzzy rules for determining the location, in said boiler, of said leak event.

2. The process of claim 1, wherein detecting the occurrence and location of said leak event is effected during at least one development stage thereof wherein the acoustical noise attributable thereto is not significantly greater in the immediate vicinity thereof than is the background acoustical noise attributable to operation of said boiler.

3. The process of claim 1, wherein, the determination of said sets of tube ULSVs and tube LLSVs and the building of said knowledge bases and said databases in steps (a)–(h) thereof is effected at a time substantially different from the time of monitoring and determining the occurrence and location of a leak event and during which steps (i)–(l) are effected.

4. The process of claim 3, wherein the time during which steps (i)–(l) are effected, is at least 24 hours subsequent to the time during which said steps (a)–(h) are effected.

5. The process of claim 1, wherein step (e) thereof, there are determined for said set of eleven LLSVs, each of which corresponds to a location in the boiler wherein it has been predetermined that a leak event is likely to occur, said locations comprising:

| Input LLSV No. | Location No. | Location in the Boiler |
| --- | --- | --- |
| LLSV 1 | 1 | Superheater Front Radiant Platen (SHFRP) |
| LLSV 2 | 2 | Reheater Front Radiant Platen (RHFRP) |
| LLSV 3 | 3 | Superheater Waterwall (SHWW) |
| LLSV 4 | 4 | Superheater Intermediate and Pendants (SHIP) |
| LLSV 5 | 5 | Superheater Outlet Pendants (SHOP) |
| LLSV 6 | 6 | Reheater Intermediate and Pendants (RHIP) |
| LLSV 7 | 7 | Reheater Outlet Pendants( RHOP) |
| LLSV 8 | 8 | Reheater Waterwall (RHWW) |
| LLSV 9 | 9 | Primary Superheater (PSH) |
| LLSV 10 | 10 | Superheater economizer (SHEC) |
| LLSV 11 | 11 | Reheater Economizer (RHEC). |

6. The process of claim 5, wherein for each of said eleven locations and associated LLSVs, the arrangement of the inputs of the corresponding LLSVs and location numbers (L#) comprise:

| L#1 | L#2 | L#3 | L#4 | L#5 | L#6 | L#7 | L#8 | L#9 | L#10 | L#11 |
| --- | --- | --- | --- | --- | --- | --- | --- | --- | --- | --- |
| LLSV 1 | LLSV 2 | LLSV 3 | LLSV 4 | LLSV 5 | LLSV 6 | LLSV 7 | LLSV 8 | LLSV 9 | LLSV 10 | LLSV 11 |
| WFH5TOT | LFNTLTR (1) | LCLW | ncfdcs (1) | WFH5TOT | WFH5TOT | WFH5TOT | TBPSI (13) | TBPSX (20) | LFNTLTS (1) | PBPGX (7) |
| PDA | PFNGRM | PWBS | PFNGSM | PFNGRM | PIPIV | PIPIV | PHPFSFOX (1) | PFNGRM | PFNGSM | FGSDAI |
| ncfdcs (1) | PWBS | WDIWS | PBPGX (11) | PWBS | LFNTLTR (1) | LFNTLTR (1). | PBD | TBPSX (20) | PBPGX (14) | TMSDCS |

7. The process of claim 6, wherein twenty LLSVs are utilized and comprise:

| VARIABLES | MEANING |
|---|---|
| FGSDAI | LEAK-OFF HDR FLOW |
| LCLW | COLDWELL TANK LEVEL |
| LFNTLTR (1) | RH BR TILT CNR #1 POSITION |
| LFNTLTS (1) | SH BR TILT CNR #1 POSITION |
| ncfdcs (1) | Pulv A Feeder Flow |
| PBD | BOILER DRUM PRESS - NORTH |
| PBPGX (11) | SH FURNACE PRESS AFTER HT SUPHT |
| PBPGX (14) | SH FURNACE PRESS AFTER ECONOMIZER |
| PBPGX (7) | RH FURNACE PRESS AFTER ECONOMIZER |
| PDA | DEAERATOR PRESSURE |
| PFNGRM | RH FURNACE DRAFT A |
| PFNGSM | SH FURNACE DRAFT A |
| PHPFSFOX (1) | TURB FIRST STAGE PRESS A |
| PIPIV | HOT REHEAT STEAM INT VLV A PRESS |
| PWBS | SH FURN WINDBOX PRESSURE |
| TBPSI 13) | RH ATTEMPT A BEFORE SPRAY STM TEMP |
| TBPSX (20) | RH OUTLET HEADER TEMPERATURE A |
| TMSDCS | SH SEC OUTLET HDR TEMPERATURE A |
| WDIWS | COLDWELL TANK MAKEUP FLOW |
| WFH5TOT | CONDENSATE FLOW TO DEAERATOR. |

8. A process for determining a boiler tube leak event in industrial boilers, said process comprising:

(a) determining for a boiler a set of tube group leak sensitive variables GLSV's:

(b) arranging said set of GLSVs into a predetermined number of individual groups;

(c) representing each individual group of GLSVs arranged in step (b), supra, with a fuzzy set comprising linguistic statements;

(d) for each of said individual groups of GLSVs arranged in step (b), supra, building a knowledge base for a corresponding first group leak inference engine GLIE which contains a set of fuzzy rules describing a fuzzy map between each GLSV in that group and a relative magnitude of said leak event;

(e) for each of said individual groups of GLIEs for which a knowledge base is built in step (d), supra, building a database for the same corresponding first GLIE which defines membership functions used in the fuzzy rules of the corresponding group knowledge base and said corresponding first GLIE further comprising a reasoning mechanism, said reasoning mechanism disposed for performing inference procedures upon said fuzzy rules for decision-making on the magnitude of said leak event;

(f) determining for said boiler a set of tube subgroup leak sensitive variables SGLSVs;

(g) arranging said set of SGLSVs into a predetermined number of individual subgroups, said predetermined number being at least equal to the predetermined number of individual groups arranged in step (b), supra, whereby there is at least one individual subgroup of SGLSVs corresponding to each individual group of GLSVs and whereby each subgroup comprises at least one SGLSV;

(h) representing each individual subgroup of SGLSVs arranged in subgroup (g), supra, with a fuzzy set comprising linguistic statements;

(i) for each of said individual subgroups of SGLSVs arranged in step (g), supra, building a knowledge base for a corresponding first subgroup leak inference engine SGLIE which contains a set of fuzzy rules describing a fuzzy map between each SGLSV in that subgroup and location of said leak event;

(j) for each of said individual subgroups of SGLIEs for which a knowledge base is built in step (i), supra, building a database for the same corresponding SGLIE which defines membership functions used in the fuzzy rules of the corresponding SGLIE further comprising a reasoning mechanism for performing inference procedures upon said fuzzy rules for decision-making on location of said leak event;

(k) thereafter monitoring said industrial boiler for occurrence of a leak event by observing changes in values in said boiler for each of said GLSVs in each group arranged in step (b), supra, and supplying said observed changes in values to each of said corresponding first group leak inference engines GLIEs for generating a fuzzy output from each thereof;

(l) simultaneously introducing each fuzzy output produced in step (k), supra, to a second GLIE, said second GLIE provided with a knowledge base comprising a set of fuzzy rules describing a fuzzy map between the magnitude of said leak event and each GLSV in the set arranged in step (b), supra, a database defining membership functions used in the fuzzy rules of said knowledge base, and a reasoning mechanism for performing inference procedures upon said fuzzy rules for comparing the fuzzy outputs in step (k), supra, to a ranking of the linguistic statements represented in step (c), supra, whereby if any of the linguistic statements is greater than a predetermined rank, concluding that a leak event is occurring and further concluding in which of the individual groups comprising the set arranged in step (b), supra, said leak event is located;

(m) thereafter monitoring said industrial boiler for further determining the location of said leak event by observing changes in values from said boiler for each of said SGLSVs corresponding to that individual group identified in step (l), supra, as containing a situs of said leak event and supplying said observed changes in values to each of said corresponding SGLIEs for generating a fuzzy output from each thereof; and (n) simultaneously introducing each fuzzy output produced in step (m), supra, to a second SGLIE provided with a knowledge base comprising a set of fuzzy rules describing a fuzzy map between the location of said leak event and each SGLSV in that group identified in step (l), supra, a database defining membership functions used in the fuzzy rules in said knowledge base of said second SGLIE and a reasoning mechanism for performing inference procedures upon each of said fuzzy rules for determining the location, in said boiler, of said leak event.

9. The process of claim 8, wherein the occurrence and location of said leak event is effected during at least one development stage thereof wherein the acoustical noise attributable thereto is not significantly greater in the immediate vicinity thereof than is the background acoustical noise attributable to operation of said boiler.

10. The process-of claim 8, wherein the determination of said set of tube GLSVs and SGLSvs and the building of said knowledge bases and said databases in steps (a)–(j) thereof is effected at a time substantially different from the time during which steps (k) and (m) are effected.

11. The process of claim 10, wherein said steps (k)–(m) are effected at least 24 hours subsequent to the time wherein steps (a)–(j) are effected.

12. The process of claim 8, wherein step (b) thereof there are arranged four individual groups for each of said four GLDSs and further, wherein the arrangement of corresponding GLSVs and associated variables comprise:

| GLSV 1 (Economizer) | GLSV 2 (Waterwall) | GLSV 3 (Superheater) | GLSV 4 (Reheater) |
|---|---|---|---|
| WDIWS | PBPGX (14) | PPRX (2) | PBPGX (6) |
| PDA | LFNTLTS (1) | PBPGX (11) | PBPGX (4) |
| PBPGX (14) | | PBPGX (14) | PBPGX (7) |
| | | FFD (1) | CHWMUVO. |

13. The process of claim 12, wherein eleven GLSVs are determined in said set and comprise:

| VARIABLE | MEANING |
|---|---|
| PPRX (2) | ID Fan Pressure |
| PBPGX (11) | SH Furnace Pressure after HT Supht |
| PBPGX (14) | SH Furnace Pressure after Economizer |
| FFD (1) | Combustion Air Flow |
| WDIWS | Coldwell Tank Makeup Flow |
| PDA | De-aerator Pressure |
| LFNTLTS (1) | SH BR Tilt CNR#1 Position |
| PBPGX (6) | Reheater Furnace Pressure after LT SHTR |
| PBPGX (4) | Reheat Furnace Pressure After Reheater |
| PBPGX (7) | Reheat Furnace Pressure After Economizer |
| CHWMUVO | Hotwell Make up Valve Demand. |

14. A system for determining a boiler tube leak event in industrial boilers, said system comprising:
 (a) tube universal leak detection ULD means for determining likelihood of an occurrence of a boiler tube leak event, said ULD means operatively associated with inputs of observed changes in an industrial boiler of universal leak sensitive variables ULSVs, comprising a first inference engine, said first inference engine provided with a knowledge base comprising a set of fuzzy rules describing a fuzzy map between each of said ULSVs and a relative magnitude of said leak event, a database defining membership functions utilized in said fuzzy rules of said knowledge base and a reasoning mechanism arranged for performing inference procedures upon said set of fuzzy rules;
 (b) a plurality of universal leak detection ULD means, each of which is operatively associated with inputs of one of a plurality of observed changes in said industrial boiler of local leak sensitive variables LLSVs, each of said ULD means comprising a corresponding second inference engine, each said second inference engine provided with a knowledge base comprising a set of fuzzy rules describing a fuzzy map between the corresponding LLSV and a location of said leak event, a database which defines membership functions utilized in said fuzzy rules, and a reasoning mechanism arranged for performing inference procedures upon said set of fuzzy rules; and
 (c) third inference engine means for receiving an output from each of said plurality of ULD means and for determining a location in the boiler of said d leak event said third inference engine provided with a knowledge base comprising a set of fuzzy rules describing a fuzzy map between each of said ULD means and a location in the boiler of said leak event, a database which defines membership functions utilized in said fuzzy rules, and a reasoning mechanism arranged for performing inference procedures upon said set of fuzzy rules, and of the output from each of said plurality of ULD means.

15. The system of claim 14, wherein there are provided at least one first inference engine and about eleven of said corresponding second inference engines.

16. The system of claim 15, wherein there are provided about three inputs of said ULSVs to said first inference engine.

17. The system of claim 16, wherein three inputs of said ULSVs comprise:

| VARIABLES | MEANING |
|---|---|
| WDIWS | COLDWELL TANK MAKEUP FLOW |
| FFD (2) | COMBUSTION AIR FLOW A1 |
| PPRX (2) | ID FAN A INLET SUCTION PRESS. |

18. The system of claim 17, wherein there are provided about twenty inputs of said LLSVs to eleven corresponding second inference engines.

19. The system of claim 18, wherein said about twenty inputs of said LLSVs comprise:

| VARIABLES | MEANING |
|---|---|
| FGSDAI | LEAK-OFF HDR FLOW |
| LCLW | COLDWELL TANK LEVEL |
| LFNTLTR (1) | RH BR TILT CNR #1 POSITION |
| LFNTLTS (1) | SH BR TILT CNR #1 POSITION |
| ncfdcs (1) | Pulv A Feeder Flow |
| PBD | BOILER DRUM PRESS - NORTH |
| PBPGX (11) | SH FURNACE PRESS AFTER HT SUPHT |
| PBPGX (14) | SH FURNACE PRESS AFTER ECONOMIZER |
| PBPGX (7) | RH FURNACE PRESS AFTER ECONOMIZER |
| PDA | DEAERATOR PRESSURE |
| PFNGRM | RH FURNACE DRAFT A |
| PFNGSM | SH FURNACCE DRAFT A |
| PHPFSFOX (1) | TURB FIRST STAGE PRESS A |
| PIPIV | HOT REHEAT STEAM INT VLV A PRESS |
| PWBS | SH FURN WINDBOX PRESSURE |
| TBPSI (13) | RH ATTEMPT A BEFORE SPRAY STM TEMP |
| TBPSX (20) | RH OUTLET HEADER TEMPERATURE A |
| TMSDCS | SH SEC OUTLET HDR TEMPERATURE A |
| WDIWS | COLDWELL TANK MAKEUP FLOW |
| WFH5TOT | CONDENSATE FLOW TO DEAERATOR. |

20. A system for determining a boiler tube leak event in industrial boilers, said system comprising:
 (a) a plurality of first tube group leak detection GLD means for determining likelihood of an occurrence of a tube leak event, each of said GLD means operatively associated with inputs of observed changes in said industrial boiler of at least one corresponding group leak sensitive variable GLSV and comprising a corresponding first group leak inference engine GLIE, each said first GLIE provided with a knowledge base comprising a set of fuzzy rules describing a fuzzy map between said at least one corresponding GLSV and a relative magnitude and group location of said leak event, a database which defines membership functions utilized in said fuzzy rules, and a reasoning mechanism arranged for performing inference procedures upon said set of fuzzy rules;
 (b) second GLIE engine means for receiving an output from each of said plurality of GLD means and for determining likelihood of a leak event and the corresponding GLD means by which such boiler leak event is represented, said second GLIE engine provided with a knowledge base comprising a set of fuzzy rules describing a fuzzy map between each such output from each said GLD means and location of said leak event, a database which defines membership functions utilized in said fuzzy rules, and a reasoning mechanism arranged for performing inference procedures upon said fuzzy rules, and of said outputs from each of said plurality of GLDS means;

(c) a plurality of first subgroup leak detection SGLD means for determining in the GLD represented in step (b), supra, location of said leak event, said SGLD means operatively associated with inputs of observed changes in said industrial boiler of at least one subgroup leak sensitive variable SGLSV, and comprising a corresponding first subgroup leak inference engine SGLIE, said first SGLIE engine provided with a knowledge base comprising a set of fuzzy rules describing a fuzzy map between said corresponding SGLSVs and the subgroup location of said leak event, a database which defines membership functions utilized in said fuzzy rules, and a reasoning mechanism arranged for performing inference procedures upon said set of fuzzy rules; and (d) second SGLIE for receiving an output from each of said plurality of SGLD means and for determining location in the boiler of said leak event, said second SGLIE provided with a knowledge base comprising a set of fuzzy rules describing a fuzzy map between each Such output from each of said plurality of SGLD means and location of said leak event, a database which defines membership functions utilized in said fuzzy rules, and a reasoning mechanism arranged for performing inference procedures upon said fuzzy rules, and of said outputs of each of said plurality of SGLD means.

21. The system of claim 20, wherein there are provided about four GLDSs and about six SGLDSs.

22. The system of claim 21, wherein there are provided to each of said GLDSs from about two to about four inputs of said GLSVs.

23. The system of claim 22, wherein an arrangement of inputs to said GLDSs associated with each of group of GLSVs is:

| GLSV 1 (Economizer) | GLSV 2 (Waterwall) | GLSV 3 (Superheater) | GLSV 4 (Reheater) |
|---|---|---|---|
| WDIWS | PBPGX (14) | PPRX (2) | PBPGX (6) |
| PDA | LFNTLTS (1) | PBPGX (11) | PBPGX (4) |
| PBPGX (14) | | PBPGX (14) | PBPGX (7) |
| | | FFD (1) | CHWMUVO. |

24. The system of claim 23, wherein eleven GLSVs are identified and comprise:

| VARIABLE | MEANING |
|---|---|
| PPRX (2) | ID Fan Pressure |
| PBPGX (11) | SH Furnace Pressure after HT Supht |
| PBPGX (14) | SH Furnace Pressure after Economizer |
| FFD (1) | Combustion Air Flow |
| WDIWS | Coldwell Tank Makeup Flow |
| PDA | De-aerator Pressure |
| LFNTLTS (1) | SH BR Tilt CNR#1 Position |
| PBPGX (6) | Reheater Furnace Pressure after LT SHTR |
| PBPGX (4) | Reheat Furnace Pressure After Reheater |
| PBPGX (7) | Reheat Furnace Pressure After Economizer |
| CHWMUVO | Hotwell Make up Valve Demand. |

25. The system of claim 21, wherein the arrangement of six inputs to said plurality of second subgroup inference engines associated with said subgroups of SGLDSs is:

| SGLSV 11 | SGLSV 12 | SGLSV 2 | SGLSV 3 | SGLSV 41 | SGLSV 42 |
|---|---|---|---|---|---|
| PBPGX (14) | PBPGX (13) | WDIWS | PBPGX (14) | PBPGX (6) | PBPGX (6) |
| PBPGX (13) | PBPGX (11) | PDA | LFNTLTS (1) | PBPGX (4) | PBPGX (7) |
| | FFD (1) | PBPGX (14) | | | CHWMUVO |
| | PPRX (2). | | | | |

* * * * *